(12) United States Patent
Koumura

(10) Patent No.: US 9,321,321 B2
(45) Date of Patent: Apr. 26, 2016

(54) VEHICLE STATE ESTIMATING DEVICE, VEHICLE STATE ESTIMATING METHOD, AND VEHICLE CONTROL DEVICE

(71) Applicant: TOYOTA JIDOSHA KABUSHIKI KAISHA, Toyota-shi, Aichi (JP)

(72) Inventor: Shingo Koumura, Susono (JP)

(73) Assignee: TOYOTA JIDOSHA KABUSHIKI KAISHA, AiIchi-ken (JP)

(*) Notice: Subject to any disclaimer, the term of this patent is extended or adjusted under 35 U.S.C. 154(b) by 0 days.

(21) Appl. No.: 14/567,269

(22) Filed: Dec. 11, 2014

(65) Prior Publication Data

US 2015/0183289 A1  Jul. 2, 2015

(30) Foreign Application Priority Data

Dec. 26, 2013 (JP) ................................ 2013-270333

(51) Int. Cl.
- B60G 17/018 (2006.01)
- B60G 17/016 (2006.01)
- B60G 17/0165 (2006.01)
- G01M 17/06 (2006.01)
- B60G 17/08 (2006.01)

(52) U.S. Cl.
CPC ........ *B60G 17/0182* (2013.01); *B60G 17/0161* (2013.01); *B60G 17/0162* (2013.01); *B60G 17/0164* (2013.01); *B60G 17/0165* (2013.01); *B60G 17/08* (2013.01); *G01M 17/06* (2013.01); *B60G 2400/0511* (2013.01); *B60G 2400/0512* (2013.01); *B60G 2400/0521* (2013.01); *B60G 2400/0522* (2013.01); *B60G 2400/204* (2013.01); *B60G 2500/10* (2013.01)

(58) Field of Classification Search
USPC ....................................................... 701/1–50
See application file for complete search history.

(56) References Cited

U.S. PATENT DOCUMENTS

| | | | |
|---|---|---|---|
| 2012/0059544 A1* | 3/2012 | Kinoshita et al. | 701/22 |
| 2012/0290171 A1* | 11/2012 | Koumura | 701/37 |
| 2013/0226405 A1* | 8/2013 | Koumura et al. | 701/38 |
| 2014/0358373 A1* | 12/2014 | Kikuchi et al. | 701/38 |
| 2015/0032332 A1* | 1/2015 | Kikuchi et al. | 701/37 |
| 2015/0046035 A1* | 2/2015 | Kikuchi et al. | 701/37 |
| 2015/0066295 A1* | 3/2015 | Kanda | 701/38 |

FOREIGN PATENT DOCUMENTS

| | | |
|---|---|---|
| JP | 05-319051 A | 12/1993 |
| JP | 06-048139 A | 2/1994 |

* cited by examiner

*Primary Examiner* — Rami Khatib
*Assistant Examiner* — Timothy Nesley
(74) *Attorney, Agent, or Firm* — Sughrue Mion, PLLC

(57) ABSTRACT

A vehicle state estimating device includes a wheel speed detection unit; a brake operation amount detection unit; a drive operation amount detection unit; a steering operation amount detection unit; a first state amount estimating unit configured to estimate a sprung state amount caused by an operation input; a first fluctuation estimating unit configured to estimate a wheel speed fluctuation amount caused by an operation input; a second fluctuation estimating unit configured to estimate an actual wheel speed fluctuation amount from which a wheel speed fluctuation amount by a brake/drive force is excluded; a third fluctuation estimating unit configured to estimate a wheel speed fluctuation amount caused by a road surface input; and a second state amount estimating unit configured to estimate at least one of a sprung state amount and an unsprung state amount caused by a road surface input.

6 Claims, 15 Drawing Sheets

FRONT AND BACK
DIRECTION OF
VEHICLE

FRONT AND BACK
DIRECTION OF
VEHICLE

VEHICLE STATE ESTIMATING DEVICE, VEHICLE STATE ESTIMATING METHOD, AND VEHICLE CONTROL DEVICE

CROSS-REFERENCE TO RELATED APPLICATIONS

The present application claims priority to and incorporates by reference the entire contents of Japanese Patent Application No. 2013-270333 filed in Japan on Dec. 26, 2013.

BACKGROUND OF THE INVENTION

1. Field of the Invention

The present invention relates to a vehicle state estimating device, a vehicle state estimating method, and a vehicle control device.

2. Description of the Related Art

A detection device for detecting a roll of a vehicle based on a wheel speed is conventionally known. For example, Japanese Patent Application Laid-open No. 5-319051 discloses a roll detection device for detecting a rotation movement about a front-back axis of a vehicle, the roll detection device including first and second wheel speed detection units that detect wheel speeds on the left and right of the vehicle, respectively; first and second wheel speed fluctuation amount extracting units for obtaining a fluctuation amount of the wheel speed in a sprung resonance frequency region for each of the left and right wheels based on detected left and right wheel speeds; and a roll computing unit for computing a magnitude of the rotation movement about the front-back axis of the vehicle based on a reverse phase component of the obtained fluctuation amount for the left and right wheels.

The fluctuation amount of the wheel speed is subjected to the influence of not only the behavior of a sprung portion but also the behavior of an unsprung portion. Thus, for example, the difference in the wheel speeds of the left and right wheels may not necessarily indicate the roll as is. Furthermore, the fluctuation amount of the wheel speed contains a component generated by the sprung behavior caused by an operation input. If the vehicle state is estimated from the fluctuation amount of the wheel speed containing such component, an accurate estimation may not be carried out. Thus, improvements still can be made in enhancing the accuracy of when estimating the state amount of the vehicle from the wheel speed.

SUMMARY OF THE INVENTION

It is an object of the present invention to provide a vehicle state estimating device, a vehicle state estimating method, and a vehicle control device capable of enhancing the estimation accuracy in estimating the state amount of the vehicle from the wheel speed.

It is an object of the present invention to at least partially solve the problems in the conventional technology.

According to one aspect of the present embodiment, a vehicle state estimating device includes a wheel speed detection unit configured to detect a wheel speed of each wheel; a brake operation amount detection unit configured to detect a brake operation amount; a drive operation amount detection unit configured to detect a drive operation amount; a steering operation amount detection unit configured to detect a steering operation amount; a first state amount estimating unit configured to estimate a sprung state amount of a vehicle caused by an operation input based on the brake operation amount, the drive operation amount, and the steering operation amount; a first fluctuation estimating unit configured to estimate a wheel speed fluctuation amount caused by an operation input based on the sprung state amount caused by the operation input; a second fluctuation estimating unit configured to estimate an actual wheel speed fluctuation amount from which a wheel speed fluctuation amount by a brake/drive force is excluded based on the wheel speed detected by the wheel speed detection unit; a third fluctuation estimating unit configured to estimate a wheel speed fluctuation amount caused by a road surface input by removing a wheel speed fluctuation amount caused by the operation input from the actual wheel speed fluctuation amount; and a second state amount estimating unit configured to estimate at least one of a sprung state amount and an unsprung state amount caused by the road surface input based on the wheel speed fluctuation amount caused by the road surface input.

According to another aspect of the present embodiment, in the vehicle state estimating device, the wheel speed fluctuation amount caused by the operation input is estimated based on an up-down displacement, a front-back displacement, and a pitch angle of a sprung gravity center estimated based on the brake operation amount and the drive operation amount, and a left-right displacement, a roll angle, and a yaw angle of a sprung gravity center estimated based on the steering operation amount.

According to still another aspect of the present embodiment, the vehicle state estimating device further includes a third state amount estimating unit configured to estimate a total sprung state amount, which is a sprung state amount obtained by adding an estimated value of the sprung state amount caused by the operation input and an estimated value of the sprung state amount caused by the road surface input.

According to one aspect of the present embodiment, a vehicle control device includes a wheel speed detection unit configured to detect a wheel speed of each wheel; a brake operation amount detection unit configured to detect a brake operation amount; a drive operation amount detection unit configured to detect a drive operation amount; a steering operation amount detection unit configured to detect a steering operation amount; a first state amount estimating unit configured to estimate a sprung state amount of a vehicle caused by an operation input based on the brake operation amount, the drive operation amount, and the steering operation amount; a first fluctuation estimating unit configured to estimate a wheel speed fluctuation amount caused by an operation input based on the sprung state amount caused by the operation input; a second fluctuation estimating unit configured to estimate an actual wheel speed fluctuation amount from which a wheel speed fluctuation amount by a brake/drive force is excluded based on the wheel speed detected by the wheel speed detection unit; a third fluctuation estimating unit configured to estimate a wheel speed fluctuation amount caused by a road surface input by removing a wheel speed fluctuation amount caused by the operation input from the actual wheel speed fluctuation amount; a second state amount estimating unit configured to estimate at least one of a sprung state amount and an unsprung state amount caused by the road surface input based on the wheel speed fluctuation amount caused by the road surface input; and a control unit configured to control a suspension device of the vehicle based on at least one of an estimated value of the sprung state amount and an estimated value of the unsprung state amount caused by the road surface input.

According to one aspect of the present embodiment, a vehicle state estimating method includes the steps of: detecting a wheel speed of each wheel; detecting a brake operation amount; detecting a drive operation amount; detecting a steering operation amount; estimating a sprung state amount of a vehicle caused by an operation input based on the brake operation amount, the drive operation amount, and the steering operation amount; estimating a wheel speed fluctuation amount caused by an operation input based on the sprung state amount caused by the operation input; estimating an actual wheel speed fluctuation amount from which a wheel speed fluctuation amount by a brake/drive force is excluded based on the wheel speed detected in the wheel speed detecting step; estimating a wheel speed fluctuation amount caused by a road surface input by removing a wheel speed fluctuation amount caused by the operation input from the actual wheel speed fluctuation amount; and estimating at least one of a sprung state amount and an unsprung state amount caused by the road surface input based on the wheel speed fluctuation amount caused by the road surface input.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A vehicle state estimating device, a vehicle state estimating method, and a vehicle control device according to an embodiment of the present invention will be hereinafter described in detail with reference to the drawings. It should be recognized that the present invention is not to be limited by the embodiments. The configuring elements in the following embodiment include configuring elements easily contrived by those skilled in the art or substantially the same configuring elements.

Embodiment

Figure 1:
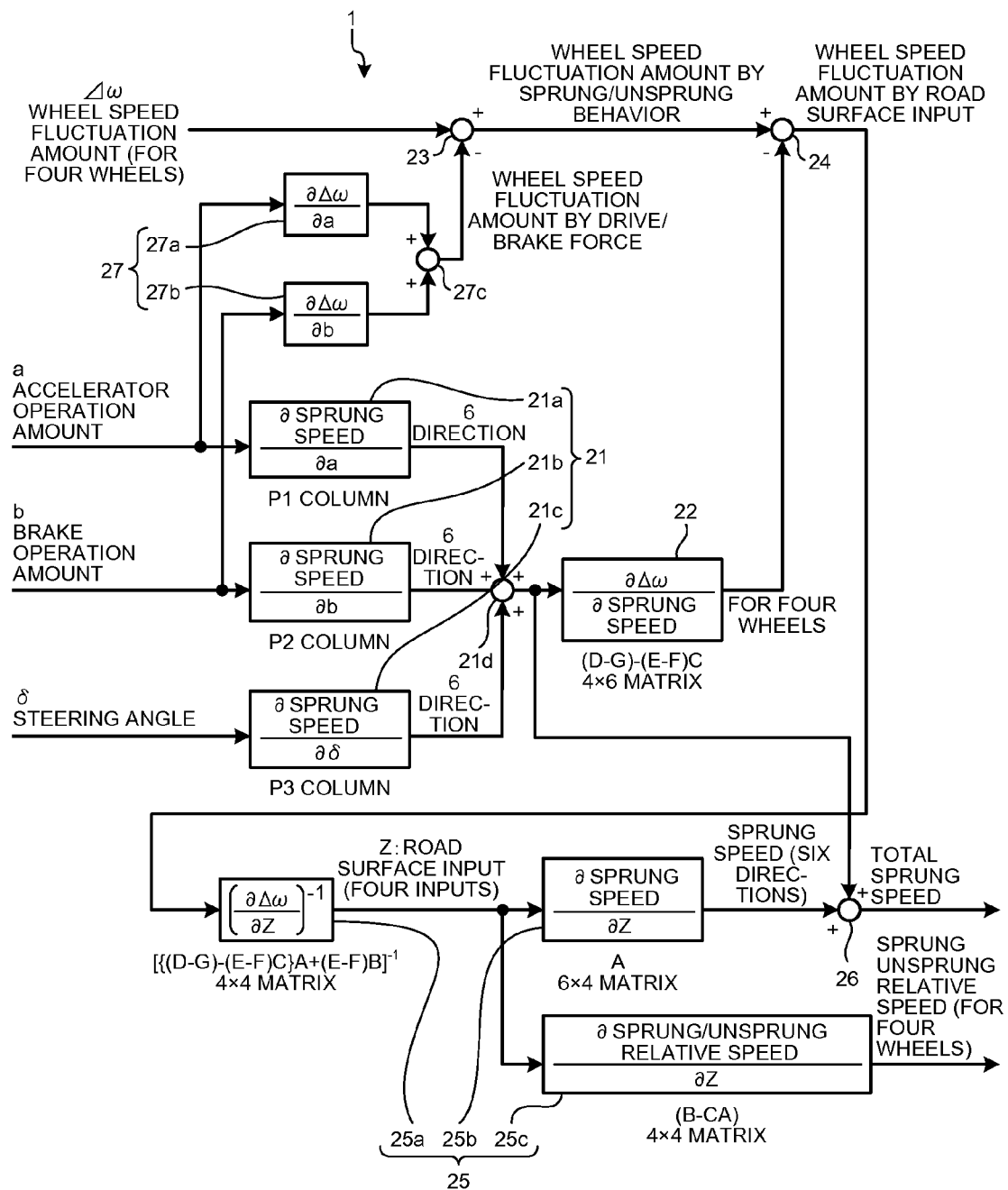
FIG. 1 is a block diagram of a vehicle state estimating device according to an embodiment.
Figure 2:
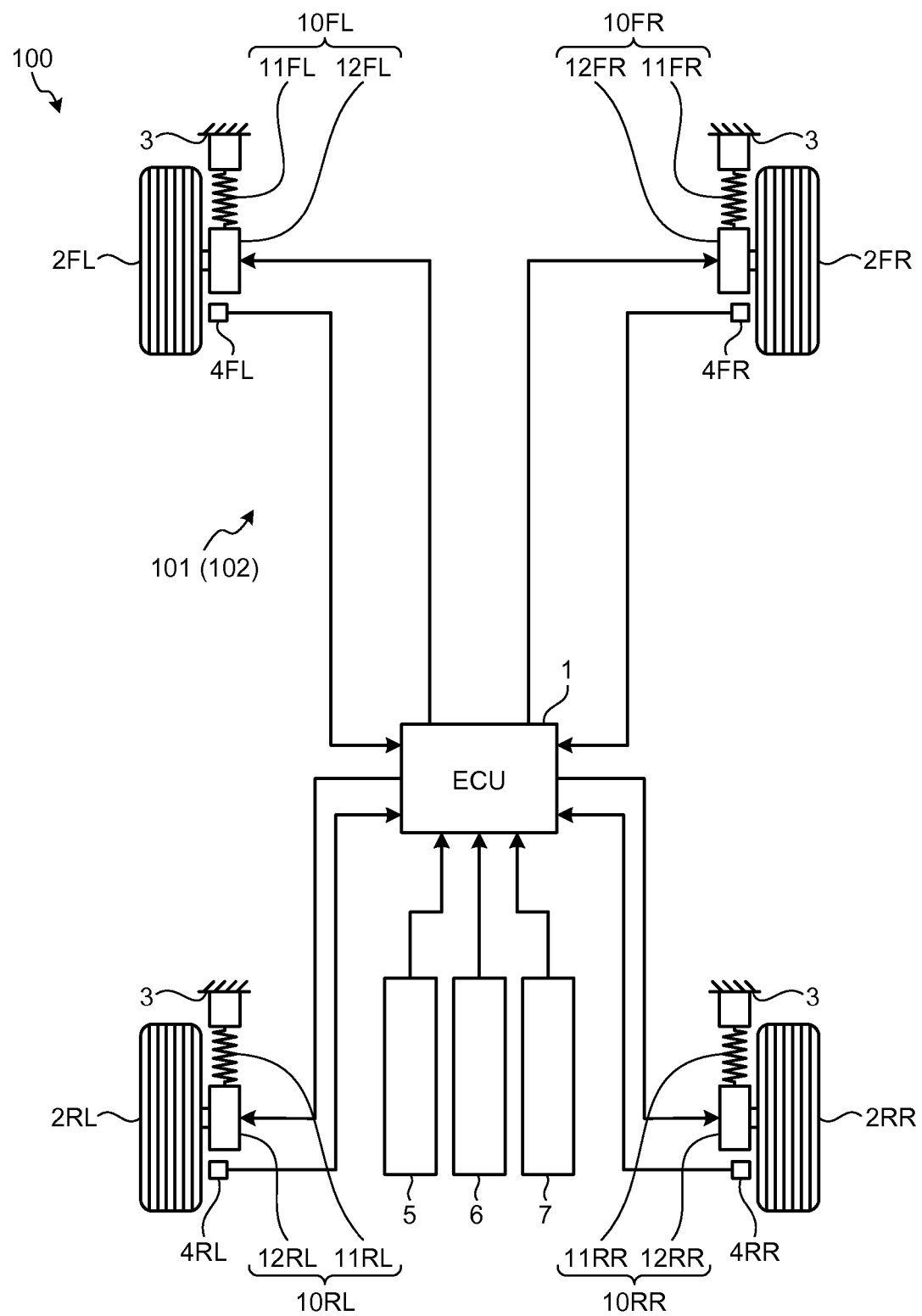
FIG. 2 is a schematic configuration diagram of a vehicle according to the embodiment.
Figure 3:
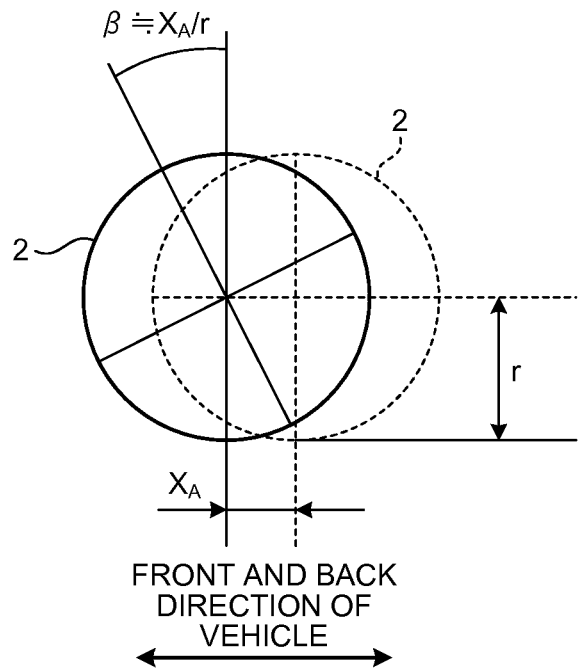
FIG. 3 is a view describing a fluctuation amount of a rotation angle of a wheel.
Figure 4:
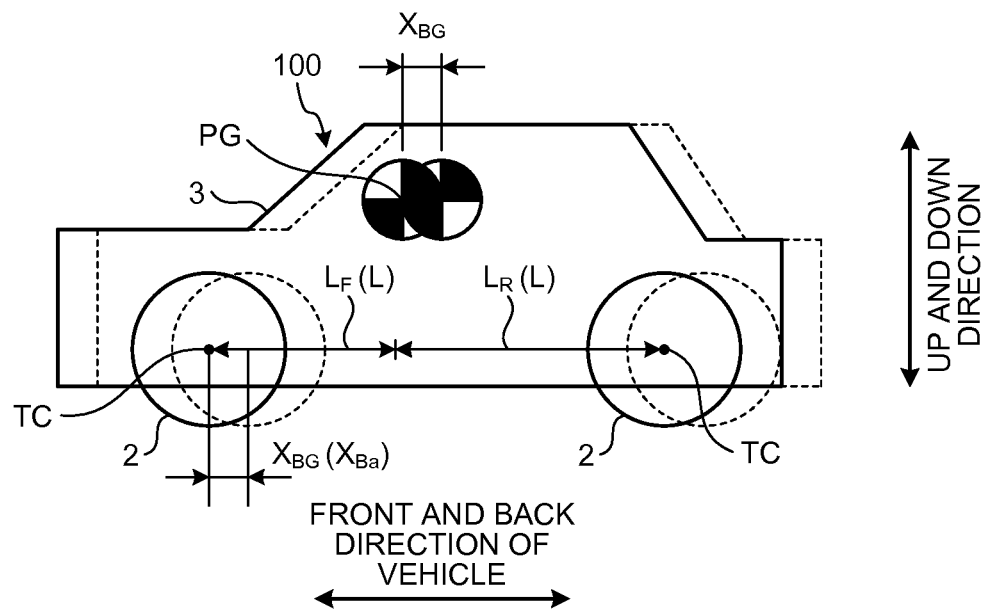
FIG. 4 is an explanatory view of a front-back displacement fluctuation amount.
Figure 5:
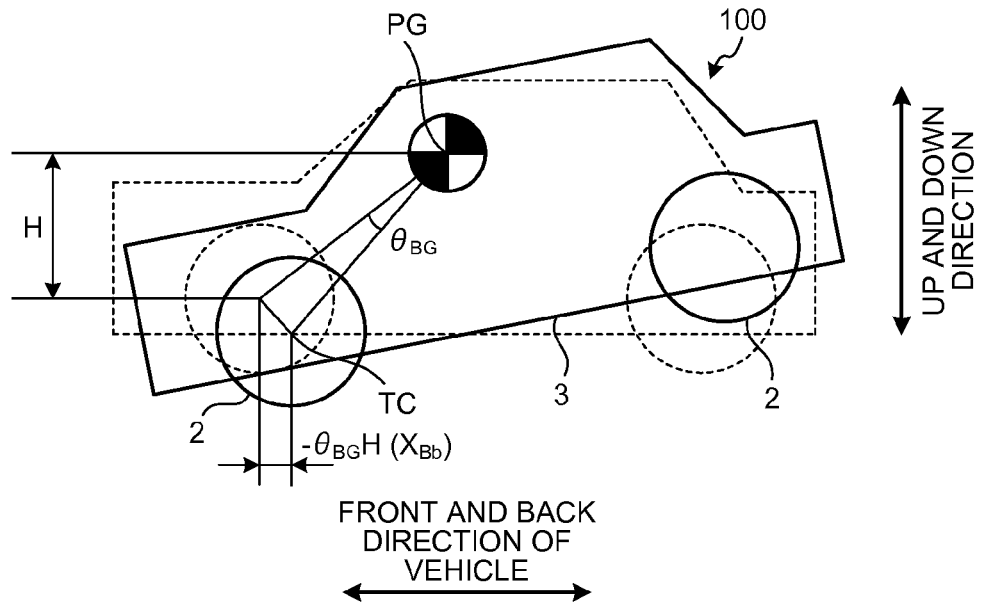
FIG. 5 is an explanatory view of a front-back displacement fluctuation amount by pitching.
Figure 6:
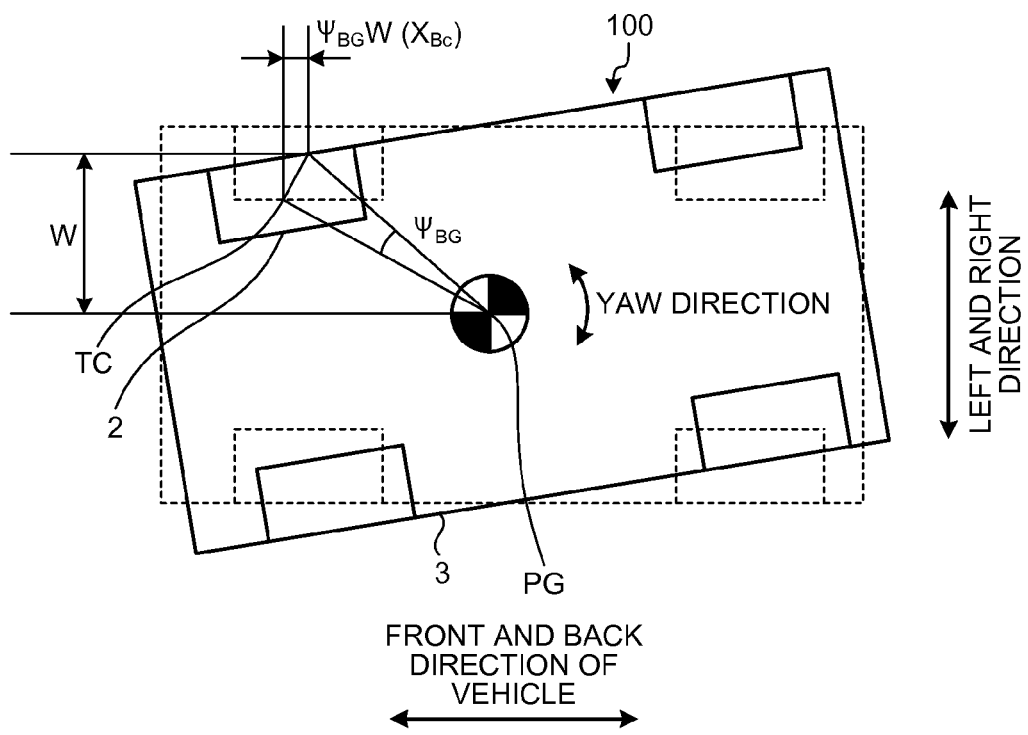
FIG. 6 is an explanatory view of a front-back displacement fluctuation amount by a rotation of the vehicle.
Figure 7:
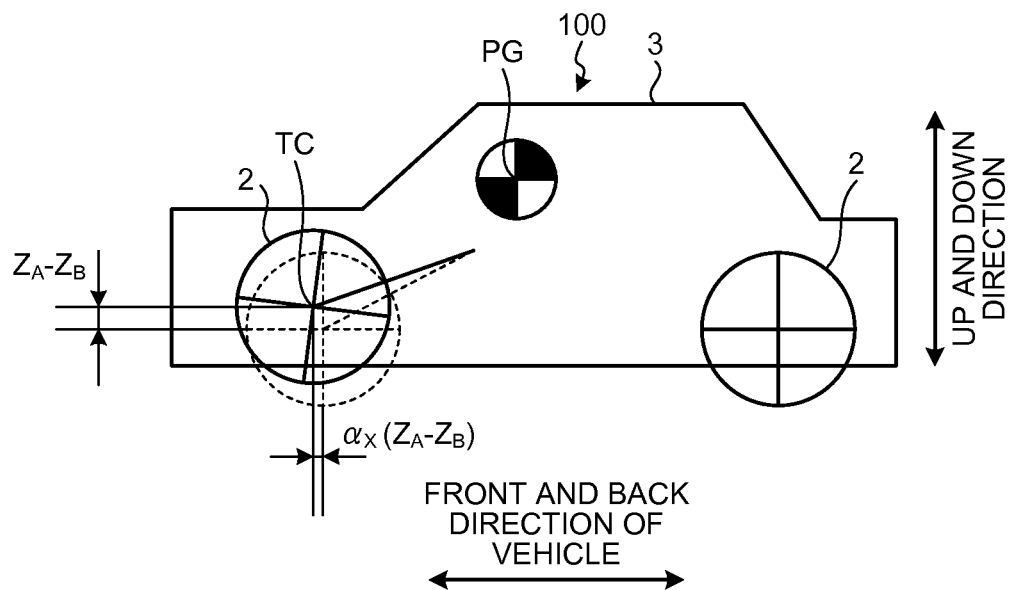
FIG. 7 is an explanatory view of a front-back displacement fluctuation amount by a stroke of a suspension device.
Figure 8:
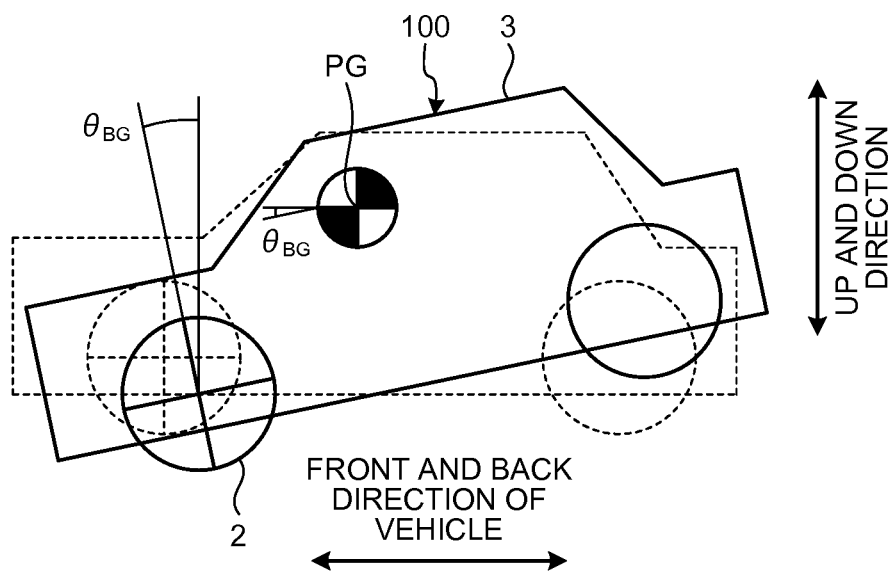
FIG. 8 is an explanatory view of an unsprung pitch angle by the pitching.
Figure 9:
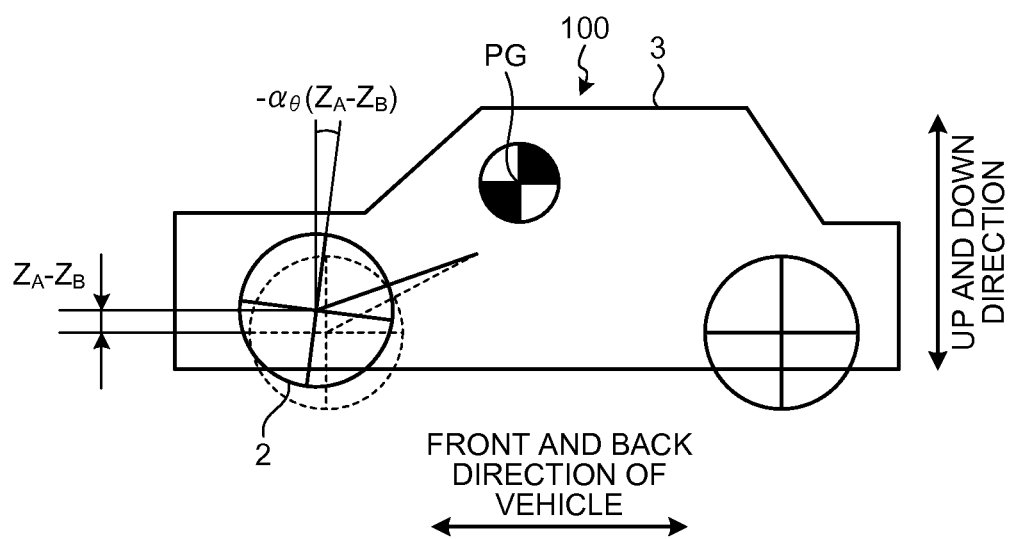
FIG. 9 is an explanatory view of an unsprung pitch angle by the stroke of the suspension device.
Figure 10:
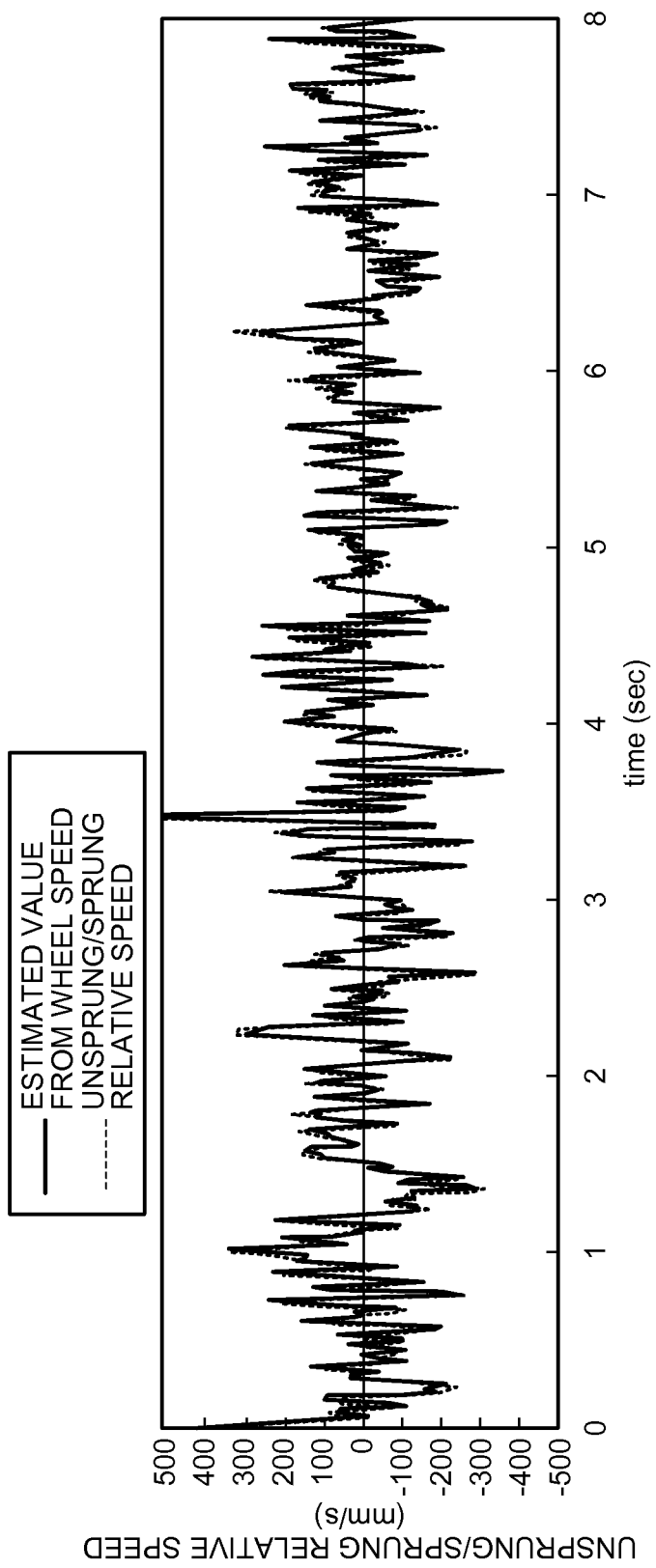
FIG. 10 is a view illustrating one example of an estimation result by the vehicle state estimating device according to the embodiment.

An embodiment will be described with reference to FIGS. 1 to 25. The present embodiment relates to a vehicle state estimating device, a vehicle state estimating method, and a vehicle control device. FIG. 1 is a block diagram of a vehicle state estimating device according to an embodiment of the present invention; FIG. 2 is a schematic configuration diagram of a vehicle according to the embodiment; FIG. 3 is a view describing a fluctuation amount of a rotation angle of a wheel; FIG. 4 is an explanatory view of a front-back displacement fluctuation amount; FIG. 5 is an explanatory view of a front-back displacement fluctuation amount by pitching; FIG. 6 is an explanatory view of a front-back displacement fluctuation amount by a rotation of the vehicle; FIG. 7 is an explanatory view of a front-back displacement fluctuation amount by a stroke of a suspension device; FIG. 8 is an explanatory view of an unsprung pitch angle by the pitching; FIG. 9 is an explanatory view of the unsprung pitch angle by the stroke of the suspension device; and FIG. 10 is a view illustrating one example of an estimation result by the vehicle state estimating device according to the embodiment.

A vehicle state estimating device 101 according to the present embodiment estimates a sprung speed, and a relative speed of a sprung portion and an unsprung portion as state amounts of the vehicle. A method of estimating the state amount of the vehicle includes an estimating method based on a fluctuation amount of a wheel speed. However, the fluctuation amount of the wheel speed is subjected to the influence of not only a behavior of the sprung portion but also a behavior of the unsprung portion. Furthermore, the fluctuation amount of the wheel speed contains a component generated by the sprung behavior caused by an operation input. If the vehicle state is estimated from the fluctuation amount of the wheel speed containing such component, an accurate estimation may not be carried out.

The vehicle state estimating device 101 according to the present embodiment removes a wheel speed fluctuation amount by the sprung behavior caused by the operation input (accelerator, brake, steering) of the wheel speed fluctuation amount, and estimates a road surface input from a relationship between the road surface input and the wheel speed fluctuation amount. The behaviors of the sprung portion and the unsprung portion are estimated from the estimated road surface input. According to the vehicle state estimating device 101 of the present embodiment, the vehicle state can be estimated with satisfactory accuracy from the wheel speed.

First, a vehicle 100 according to the present embodiment will be described with reference to FIG. 2. As illustrated in FIG. 2, the vehicle 100 is configured to include the vehicle state estimating device 101, a wheel 2 (2FR, 2FL, 2RR, 2RL), and a suspension device 10 (10FR, 10FL, 10RR, 10RL). The vehicle state estimating device 101 of the present embodiment is configured to include an ECU 1, a wheel speed detection unit 4 (4FR, 4FL, 4RR, 4RL), a brake operation amount detection unit 5, a drive operation amount detection unit 6, and a steering operation amount detection unit 7. As will be described later, the ECU 1 of the present embodiment has a function serving as a control unit for controlling the suspension device 10 (10FR, 10FL, 10RR, 10RL). Therefore, the vehicle 100 is mounted with a vehicle control device 102 including the ECU 1, the wheel speed detection unit 4, the brake operation amount detection unit 5, the drive operation amount detection unit 6, and the steering operation amount detection unit 7.

The vehicle 100 includes, for the wheel 2, a front right wheel 2FR, a front left wheel 2FL, a rear right wheel 2RR, and a rear left wheel 2RL. The vehicle 100 includes, for the suspension device 10, a front right suspension device 10FR, a front left suspension device 10FL, a rear right suspension device 10RR, and a rear left suspension device 10RL. In the present specification, a suffix FR of a reference symbol of each configuring element indicates association to the front right wheel 2FR. Similarly, a suffix FL of a reference symbol indicates association to the front left wheel 2FL, RR indicates association to the rear right wheel 2RR, and RL indicates association to the rear left wheel 2RL.

The suspension device 10 connects the unsprung portion and the sprung portion. Here, the unsprung portion includes front and rear arm members, a knuckle, and the like, and is a portion connected to the wheel 2 side with respect to the suspension device 10 in the vehicle 100. The sprung portion is a portion supported by the suspension device 10 in the vehicle 100, and is, for example, a body 3. The suspension device 10 allows the relative displacement of the sprung portion and the unsprung portion by extending and contracting. The suspension device 10 is arranged inclined at a predetermined angle with respect to a vertical axis, for example.

The suspension device 10 is configured to include a shock absorber 11 (11FR, 11FL, 11RR, 11RL) and a suspension actuator 12 (12FR, 12FL, 12RR, 12RL). The shock absorber 11 generates an attenuating force for attenuating the relative movement of the sprung portion and the unsprung portion. The suspension actuator 12 adjusts the attenuating force (attenuation coefficient) generated by the shock absorber 11. The suspension actuator 12 can change the attenuating property of the shock absorber 11 to an arbitrary property from a relatively soft attenuating property (small attenuating force) to a relatively hard attenuating property (large attenuating force).

Each wheel 2FR, 2FL, 2RR, 2RL is provided with the wheel speed detection unit 4 (4FR, 4FL, 4RR, 4RL) that detects the respective wheel speed. The front right wheel speed detection unit 4FR detects the wheel speed of the front right wheel 2FR. Similarly, the front left wheel speed detection unit 4FL, the rear right wheel speed detection unit 4RR, and the rear left wheel speed detection unit 4RL respectively detect the wheel speed of the front left wheel 2FL, the rear right wheel 2RR, and the rear left wheel 2RL. A signal indicating the detection result of each wheel speed detection unit 4FR, 4FL, 4RR, 4RL is output to the ECU 1.

The ECU 1 of the present embodiment is an electronic control unit including a computer. The ECU 1 has a function serving as each estimating unit that estimates the vehicle state. The ECU 1 is electrically connected to the suspension device 10 of each wheel 2FR, 2FL, 2RR, 2RL and controls the suspension device 10.

The brake operation amount detection unit 5 detects a brake operation amount. The brake operation amount is, for example, a pedal stroke of a brake pedal, a depressing force input to the brake pedal, a pedal speed of the brake pedal, and the like. The drive operation amount detection unit 6 detects a drive operation amount. The drive operation amount is, for example, an opening degree of an accelerator pedal, a pedal speed of the accelerator pedal, an opening degree of a throttle valve, and the like. The steering operation amount detection unit 7 detects a steering operation amount. The steering operation amount is, for example, a steering angle, a steering torque, a steering speed, and the like of a steering wheel. Signals indicating the detection results of the brake operation amount detection unit 5, the drive operation amount detection unit 6, and the steering operation amount detection unit 7 are output to the ECU 1.

As illustrated in the block diagram of FIG. 1, the ECU 1 according to the present embodiment is configured to include a first state amount estimating unit 21, a first fluctuation estimating unit 22, a second fluctuation estimating unit 23, a third fluctuation estimating unit 24, a second state amount estimating unit 25, and a third state amount estimating unit 26.

First State Amount Estimating Unit

The first state amount estimating unit 21 estimates a sprung state amount of the vehicle 100 caused by the operation input based on the brake operation amount, the drive operation amount, and the steering operation amount. The sprung state amount is a state amount of the sprung portion of the vehicle 100, and is, for example, the behavior of the sprung portion. The sprung state amount of the present embodiment includes a speed of displacement fluctuation in a front and back direction, left and right direction, and up and down direction of a gravity center position of the sprung portion, and a pitch angular speed, a roll angular speed, and a yaw angular speed of the sprung portion. The displacement fluctuation of the gravity center position of the sprung portion (hereinafter simply referred to as "gravity center position") is a shift amount of an actual gravity center position with respect to a gravity center position determined from the vehicle speed of the vehicle 100 of a certain time.

For example, if the vehicle 100 bounded in the up and down direction due to the bumps of the road surface during the traveling of the vehicle 100, the displacement fluctuation in the up and down direction of the gravity center position occurs. When the brake operation or the drive operation is carried out, the displacement fluctuation of the gravity center position in the front and back direction of the vehicle and the fluctuation of the pitch angle occur. Furthermore, when the steering operation is carried out, the displacement fluctuation of the gravity center position in the left and right direction, and the fluctuation in the yaw angle, the roll angle, and the like occur.

The first state amount estimating unit 21 estimates the sprung state amount caused by the operation input based on the brake operation amount detected by the brake operation amount detection unit 5, the drive operation amount detected by the drive operation amount detection unit 6, and the steering operation amount detected by the steering operation amount detection unit 7. The first state amount estimating unit 21 includes an estimating unit 21a based on the drive operation, an estimating unit 21b based on the brake operation, and an estimating unit 21c based on the steering operation.

The estimating unit 21a based on the drive operation estimates the sprung state amount generated by the drive operation based on a drive operation amount a acquired from the drive operation amount detection unit 6. The estimating unit 21b based on the brake operation estimates the sprung state amount generated by the brake operation based on a brake operation amount b acquired from the brake operation amount detection unit 5. The estimating unit 21c based on the steering operation estimates the sprung state amount generated by the steering operation based on a steering operation amount δ acquired from the steering operation amount detection unit 7. The sprung state amounts estimated by each of the estimating units 21a, 21b, 21c are added by an adding unit 21d. A value output from the adding unit 21d is a "sprung state amount caused by the operation input" in which the sprung state amount by the drive operation, the sprung state amount by the brake operation, and the sprung state amount by the steering operation are added. The sprung state amount caused by the operation input is input from the adding unit 21d to the first fluctuation estimating unit 22.

First Fluctuation Estimating Unit

The first fluctuation estimating unit 22 estimates the wheel speed fluctuation amount caused by the operation input based on the sprung state amount caused by the operation input. The change in the state amount occurs at the sprung portion of the vehicle 100 by each operation input of drive, brake, and steering. The first fluctuation estimating unit 22 estimates the wheel speed fluctuation amount of each wheel 2 generated by the sprung behavior.

The ECU 1 includes a wheel speed fluctuation estimating unit 27 by a brake/drive force. The wheel speed fluctuation estimating unit 27 by the brake/drive force includes an estimating unit 27a based on the drive force and an estimating unit 27b based on the brake force. The estimating unit 27a based on the drive force estimates the wheel speed fluctuation amount of each wheel 2 by the drive force based on the drive operation amount a. The estimating unit 27b based on the brake force estimates the wheel speed fluctuation amount of each wheel 2 by the brake force based on the brake operation amount b. The wheel speed fluctuation amount estimated by the estimating unit 27a based on the drive force and the wheel speed fluctuation amount estimated by the estimating unit 27b based on the brake force are added by an adding unit 27c. A value output from the adding unit 27c is a wheel speed fluctuation amount by the drive·brake force (hereinafter referred to as "wheel speed fluctuation amount by the brake/drive force") in which the wheel speed fluctuation amount by the drive force and the wheel speed fluctuation amount by the brake force are combined. The wheel speed fluctuation amount by the brake/drive force is input from the adding unit 27c to the second fluctuation estimating unit 23.

Second Fluctuation Estimating Unit

The second fluctuation estimating unit 23 estimates the actual wheel speed fluctuation amount from which the wheel speed fluctuation amount by the brake/drive force is excluded based on the wheel speed detected by the wheel speed detection unit 4. In the present specification, the "actual wheel speed fluctuation amount" is obtained by excluding the wheel speed fluctuation amount generated by the brake/drive force, in other words, the wheel speed fluctuation amount by the change in the vehicle speed from the wheel speed fluctuation amount of the detected wheel speed. The actual wheel speed fluctuation amount includes a wheel speed fluctuation amount caused by the road surface input which is input to the wheel 2 from the bumps, and the like of the road surface, and a wheel speed fluctuation amount (wheel speed fluctuation amount caused by the operation input) by the change in the sprung state that occurs by the operation input.

Third Fluctuation Estimating Unit

The third fluctuation estimating unit 24 estimates the wheel speed fluctuation amount caused by the road surface input by removing the wheel speed fluctuation amount caused by the operation input from the actual wheel speed fluctuation amount. The third fluctuation estimating unit 24 subtracts the value output by the first fluctuation estimating unit 22 from the value output by the second fluctuation estimating unit 23. That is, the third fluctuation estimating unit 24 removes the wheel speed fluctuation amount caused by the operation input from the actual wheel speed fluctuation amount for each wheel 2. The output of the third fluctuation estimating unit 24 is input to the second state amount estimating unit 25.

Second State Amount Estimating Unit

The second state amount estimating unit 25 estimates at least one of the sprung state amount and the unsprung state amount caused by the road surface input based on the wheel speed fluctuation amount caused by the road surface input. The second state amount estimating unit 25 includes a road surface input estimating unit 25a, a sprung state amount estimating unit 25b, and a relative speed estimating unit 25c. The road surface input estimating unit 25a estimates the road surface input from the wheel speed fluctuation amount caused by the road surface input.

The sprung state amount estimating unit 25b estimates the sprung state amount caused by the road surface input based on the road surface input estimated by the road surface input estimating unit 25a. The relative speed estimating unit 25c estimates the relative speed of the sprung portion and the unsprung portion based on the road surface input estimated by the road surface input estimating unit 25a.

Third State Amount Estimating Unit

The third state amount estimating unit 26 estimates a total sprung state amount, which is the sprung state amount in which the estimated value of the sprung state caused by the operation input and the estimated value of the sprung state amount caused by the road surface input are added. The third state amount estimating unit 26 adds the estimated value of the sprung state amount caused by the road surface input which is output from the sprung state amount estimating unit 25b, and the estimated value of the sprung state amount caused by the operation input which is output from the adding unit 21d. The total sprung state amount output from the third state amount estimating unit 26 is the estimated value of the actual sprung state amount of the vehicle 100. The ECU 1 of the present embodiment controls the suspension device 10 based on the estimated total sprung state amount and the relative speed.

A theoretical formula related to the estimation of the vehicle state amount by the vehicle state estimating device 101 of the present embodiment will now be described in detail. First, a tire rotation speed fluctuation amount ω can be calculated with the following [Formula 1]. The tire rotation speed fluctuation amount ω is a fluctuation amount of the rotation speed of the wheel 2. The tire rotation speed fluctuation amount ω is the fluctuation amount of a rotation speed with respect to the rotation speed of the wheel 2 corresponding to the current vehicle speed, and is, for example, the fluctuation amount generated by the road surface input and the behavior of the sprung portion. In other words, the tire rotation speed fluctuation amount ω is the fluctuating portion (dynamic fluctuating portion) with respect to the steadily moving portion. As will be described below with reference to FIG. 3, the tire rotation speed fluctuation amount ω can be expressed with the [Formula 1] by a radius r of the wheel 2 and a front-back displacement fluctuation amount $X_A$ of the unsprung portion. The dot (•) symbol above the character indicates a differential value.

$$\omega = \dot{X}_A/r = [\dot{X}_B + (\dot{X}_A - \dot{X}_B)]/r \qquad \text{Formula 1}$$

The position of the wheel 2 indicated with a broken line in FIG. 3 is the wheel position of when the wheel 2 steadily moves, and is, for example, the wheel position at a certain predetermined time determined according to the vehicle speed. The position of the wheel 2 indicated with a solid line indicates the actual wheel position at the predetermined time. The fluctuation of the position in the front and back direction of the vehicle occurs between the wheel position indicated with the broken line and the wheel position indicated with the solid line by the road surface input and the operation input. The fluctuation of the wheel position in the front and back direction of the vehicle corresponds to the front-back displacement fluctuation amount $X_A$ of the unsprung portion. The fluctuation amount β of the rotation angle of the wheel 2 corresponding to the front-back displacement fluctuation amount $X_A$ of the unsprung portion can be approximated with $X_A/r$, as illustrated in FIG. 3. The tire rotation speed fluctuation amount ω is a value obtained by differentiating the fluctuation amount β of the rotation angle, and thus can be approximately obtained as in the [Formula 1].

A first term in the parentheses on the right side of the [Formula 1] will now be described. The first term is a differential value of a front-back displacement fluctuation amount $X_B$ of the sprung portion at an axle position TC (see FIG. 4). The axle position TC is a middle point in the width direction of the wheel 2 on the center axis line of each wheel 2. The front-back displacement fluctuation amount $X_B$ of the sprung portion at the axle position TC can be expressed as a sum of a front-back displacement fluctuation amount $X_{BG}$ of the sprung portion (gravity center position PG) illustrated in FIG. 4, a fluctuation amount based on a sprung pitch angle $\theta_{BG}$ illustrated in FIG. 5, and a fluctuation amount based on a sprung yaw angle $\Psi_{BG}$ illustrated in FIG. 6.

As illustrated in FIG. 4, when the sprung portion position fluctuates in the front and back direction of the vehicle, the front-back displacement fluctuation amount $X_B$ of the sprung portion viewed at the axle position TC includes a component $X_{Ba}$ by the position fluctuation in the front and back direction of the sprung portion. The component $X_{Ba}$ by the position fluctuation in the front and back direction is expressed as the front-back displacement fluctuation amount $X_{BG}$ of the sprung portion at the gravity center position PG, as expressed with equation (1) below.

$$X_{Ba} = X_{BG} \qquad (1)$$

When pitching occurs in the vehicle 100 as illustrated in FIG. 5, the front-back displacement fluctuation amount $X_B$ of the sprung portion viewed at the axle position TC contains a component $X_{Bb}$ by the pitching. The component $X_{Bb}$ by the pitching is expressed with the following equation (2) based on the sprung pitch angle $\theta_{BG}$. Here, H is a distance in a height direction between the axle position TC and the gravity center position PG.

$$X_{Bb} = -\theta_{BG} \times H \qquad (2)$$

When a behavior in a yaw direction (rotation about a vertical axis) occurs in the vehicle 100 as illustrated in FIG. 6, the front-back displacement fluctuation amount $X_B$ of the sprung portion viewed at the axle position TC contains a component $X_{Bc}$ by the behavior in the yaw direction. The component $X_{Bc}$ by the behavior in the yaw direction is expressed with the following equation (3) based on the sprung yaw angle $\Psi_{BG}$. Here, W is a distance between the gravity center position PG and the axle position TC in the vehicle width direction.

$$X_{Bc} = \Psi_{BG} \times W \qquad (3)$$

The sum of the above three components $X_{Ba}$, $X_{Bb}$, $X_{Bc}$ is the front-back displacement fluctuation amount $X_B$ of the sprung portion viewed at the axle position TC. That is, equation (4) is derived.

$$X_B = -\theta_{BG} \times H + X_{BG} + \Psi_{BG} \times W \qquad (4)$$

Next, a second term in the parentheses on the right side of the [Formula 1] will be described. The second term is a term related to the relative displacement of the sprung portion and the unsprung portion, that is, the up-down stroke of the suspension device 10. The wheel 2 and the body 3, which is the sprung portion, relatively displace in the up and down direction, as illustrated in FIG. 7, by the stroke of the suspension device 10. If the suspension device 10 is inclined in the front and back direction of the vehicle with respect to the up and down direction, the wheel 2 and the body 3 relatively displace also in the front and back direction of the vehicle. A difference $(X_A - X_B)$ which is a difference of the front-back displacement fluctuation amount between the sprung portion and the unsprung portion can be expressed with the following equation (5).

$$X_A - X_B = \alpha_X (Z_A - Z_B) \qquad (5)$$

Here, $Z_A$ is the up-down displacement fluctuation amount of the unsprung portion, $Z_B$ is the up-down displacement fluctuation amount of the sprung portion at the axle position TC in the front and back direction of the vehicle, and $\alpha_X$ is the relative displacement amount in the front and back direction of the vehicle between the sprung portion and the unsprung portion per unit stroke amount of the suspension device 10.

The following [Formula 2] is derived from the [Formula 1] and the equations (1) to (5).

$$\omega=[(-\dot{\theta}_{BG}H+\dot{X}_{BG}+\dot{\psi}_{BG}W)+\alpha_X(\dot{Z}_Z-\dot{Z}_B)]/r \quad \text{Formula 2}$$

An unsprung pitch angle $\theta_A$ will now be described with reference to FIG. 8 and FIG. 9. The unsprung pitch angle $\theta_A$ is the pitch angle of the unsprung portion, and indicates an inclination angle in the front and back direction of the vehicle of the unsprung portion with respect to the road surface. In the vehicle 100, the sprung pitch angle $\theta_{BG}$ and the unsprung pitch angle $\theta_A$ may differ by the extension and contraction of the suspension device 10. In other words, the unsprung pitch angle $\theta_A$ contains a component $\Theta_{Aa}$ corresponding to the sprung pitch angle $\theta_{BG}$ and a component $\theta_{Ab}$ by the extension and contraction of the suspension device 10.

As illustrated in FIG. 8, the component $\theta_{Aa}$ corresponding to the sprung pitch angle $\theta_{BG}$ is equal to the sprung pitch angle $\theta_{BG}$. That is, the component $\theta_{Aa}$ corresponding to the sprung pitch angle $\theta_{BG}$ is expressed with the following equation (6).

$$\theta_{Aa}=\theta_{BG} \quad (6)$$

FIG. 9 illustrates a state in which the suspension devices 10FR, 10FL of the front wheels 2FR, 2FL of the vehicle 100 are contracted by the road surface input, and the like, and the suspension devices 10RR, 10RL of the rear wheels 2RR, 2RL are not extended or contracted. The component $\theta_{Ab}$ by the extension and contraction of the suspension device 10 is expressed with the following equation (7), as illustrated in FIG. 9.

$$\theta_{Ab}=-\alpha_\theta(Z_A-Z_B) \quad (7)$$

Here, $\alpha_\theta$ is the unsprung pitch angle per unit stroke amount of the suspension device 10.

According to the equation (6) and the equation (7), the angular speed fluctuation of the unsprung pitch angle $\theta_A$ (differential value of the unsprung pitch angle $\theta_A$) is expressed with the following [Formula 3].

$$\dot{\theta}_A=\dot{\theta}_{BG}+\alpha_\theta(\dot{Z}_A-\dot{Z}_B) \quad \text{Formula 3}$$

A wheel speed fluctuation amount $\Delta\omega$ will now be described. The wheel speed fluctuation amount $\Delta\omega$ is the fluctuation amount of the wheel speed detected by the wheel speed detection unit 4. The wheel speed fluctuation amount $\Delta\omega$ is expressed with the following [Formula 4]. The wheel speed detected by the wheel speed detection unit 4 not only includes the rotation speed component by the relative movement in the front and back direction with respect to the road surface, but also includes the rotation speed component by the change of the unsprung pitch angle $\theta_A$. In other words, the wheel speed fluctuation amount $\Delta\omega$ is the difference of the tire rotation speed fluctuation amount $\omega$ and the angular speed fluctuation of the unsprung pitch angle $\theta_A$ as expressed in the [Formula 4]. The ECU 1 includes a wheel speed fluctuation amount estimating unit for calculating the wheel speed fluctuation amount $\Delta\omega$ by excluding the wheel speed corresponding to the current vehicle speed from the wheel speed detected by the wheel speed detection unit 4.

$$\Delta\omega=\omega-\dot{\theta}_A \quad \text{Formula 4}$$

[Formula 5] is derived by substituting the [Formula 2] and the [Formula 3] to the [Formula 4].

$$\Delta\omega=[(-\dot{\theta}_{BG}H+\dot{X}_{BG}+\dot{\psi}_{BG}W)+\alpha_X(\dot{Z}_A-\dot{Z}_B)]/r-[\dot{\theta}_{BG}+\alpha_\theta(\dot{Z}_A-\dot{Z}_S)] \quad \text{Formula 5}$$

The up-down displacement fluctuation amount will now be described. The up-down displacement fluctuation amount $Z_B$ of the sprung portion at the axle position TC can be expressed with equation (8). The first term on the right side of the equation (8) is the up-down displacement fluctuation amount of the gravity center position PG of the sprung portion. The second term on the right side of the equation (8) is the up-down displacement fluctuation amount (approximate value) by the pitching of the sprung portion. The third term on the right side of the equation (8) is the up-down displacement fluctuation amount (approximate value) by the roll of the sprung portion.

$$Z_B=Z_{BG}\pm L\times\theta_{BG}\pm W\times\phi_{BG} \quad (8)$$

Here, L is the distance between the axle position TC and the gravity center position PG in the front and back direction of the vehicle (see FIG. 4), and $\phi_{BG}$ is the sprung roll angle. For the distance L between the axle position TC and the gravity center position PG, the distance $L_F$ in the case of the front wheel 2FR, 2FL and the distance $L_R$ in the case of the rear wheel 2RR, 2RL may take different values.

Describing the equation (8) with regard to the front right wheel 2FR for, the up-down displacement fluctuation amount $Z_{B1}$ of the sprung portion at the axle position TC of the front right wheel 2FR can be obtained by adding or subtracting the up-down displacement fluctuation amount by the pitching of the sprung portion and the up-down displacement fluctuation amount by the roll of the sprung portion with respect to the up-down displacement fluctuation amount $Z_{BG}$ of the gravity center position PG. For example, when the sprung portion is pitched such that the front wheel side sinks in, the up-down displacement fluctuation amount ($L\times\theta_{BG}$) by the pitching of the sprung portion is subtracted from the up-down displacement fluctuation amount $Z_{BG}$ of the gravity center position PG. When the sprung portion is rolled such that the right side of the vehicle sinks in, the up-down displacement fluctuation amount ($W\times\phi_{BG}$) by the roll of the sprung portion is subtracted.

On the contrary, when the sprung portion is pitched such that the front wheel side lifts up, the up-down displacement fluctuation amount ($L\times\theta_{BG}$) by the pitching of the sprung portion is added to the up-down displacement fluctuation amount $Z_{BG}$ of the gravity center position PG. When the sprung portion is rolled such that the right side of the vehicle lifts up, the up-down displacement fluctuation amount ($W\times\phi_{BG}$) by the roll of the sprung portion is added. With respect to the other wheels 2FL, 2RR, 2RL as well, the up-down displacement fluctuation amount $Z_B$ of the sprung portion at the axle position is similarly calculated.

According to the equation (8), the up-down displacement fluctuating speed of the sprung portion at the axle position TC is expressed with [Formula 6].

$$\dot{Z}_B=\dot{Z}_{BG}\mp L\dot{\theta}_{BG}\mp W\phi_{BG} \quad \text{Formula 6}$$

Expanding the [Formula 1] to [Formula 6], and notating the wheel speed fluctuation amounts for the four wheels in a matrix form, the following [Formula 7] is obtained. The matrix [D] is indicated in the following [Formula 8], the matrix [G] is indicated in the following [Formula 9], the matrix [E] is indicated in the following [Formula 10], the matrix [F] is indicated in the following [Formula 11], and the matrix [C] is indicated in the following [Formula 12].

$$\begin{pmatrix} \Delta\omega_1 \\ \Delta\omega_2 \\ \Delta\omega_3 \\ \Delta\omega_4 \end{pmatrix} = \begin{pmatrix} \omega_1 - \theta_{A1}s \\ \omega_2 - \theta_{A2}s \\ \omega_3 - \theta_{A3}s \\ \omega_4 - \theta_{A4}s \end{pmatrix}$$

$$= D \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} - G \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} + E \begin{pmatrix} \dot{Z}_{A1} - \dot{Z}_{B1} \\ \dot{Z}_{A2} - \dot{Z}_{B2} \\ \dot{Z}_{A3} - \dot{Z}_{B3} \\ \dot{Z}_{A4} - \dot{Z}_{B4} \end{pmatrix} - F \begin{pmatrix} \dot{Z}_{A1} - \dot{Z}_{B1} \\ \dot{Z}_{A2} - \dot{Z}_{B2} \\ \dot{Z}_{A3} - \dot{Z}_{B3} \\ \dot{Z}_{A4} - \dot{Z}_{B4} \end{pmatrix}$$

$$= (D-G) \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} - (E-F) \begin{pmatrix} \dot{Z}_{B1} \\ \dot{Z}_{B2} \\ \dot{Z}_{B3} \\ \dot{Z}_{B4} \end{pmatrix} + (E-F) \begin{pmatrix} \dot{Z}_{A1} \\ \dot{Z}_{A2} \\ \dot{Z}_{A3} \\ \dot{Z}_{A4} \end{pmatrix}$$

$$= (D-G) \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} - (E-F)C \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} + (E-F) \begin{pmatrix} \dot{Z}_{A1} \\ \dot{Z}_{A2} \\ \dot{Z}_{A3} \\ \dot{Z}_{A4} \end{pmatrix}$$

$$= \{(D-G)-(E-F)C\} \begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} + (E-F) \begin{pmatrix} \dot{Z}_{A1} \\ \dot{Z}_{A2} \\ \dot{Z}_{A3} \\ \dot{Z}_{A4} \end{pmatrix}$$

Formula 7

$$[D] = \begin{pmatrix} 0 & -H_F/r_F & 1/r_F & 0 & 0 & W_F/r_F \\ 0 & -H_F/r_F & 1/r_F & 0 & 0 & -W_F/r_F \\ 0 & -H_R/r_R & 1/r_R & 0 & 0 & W_R/r_R \\ 0 & -H_R/r_R & 1/r_R & 0 & 0 & -W_R/r_R \end{pmatrix}$$

Formula 8

$$[G] = \begin{pmatrix} 0 & 1 & 0 & 0 & 0 & 0 \\ 0 & 1 & 0 & 0 & 0 & 0 \\ 0 & 1 & 0 & 0 & 0 & 0 \\ 0 & 1 & 0 & 0 & 0 & 0 \end{pmatrix}$$

Formula 9

$$[E] = \begin{pmatrix} \alpha_{XF}/r_F & 0 & 0 & 0 \\ 0 & \alpha_{XF}/r_F & 0 & 0 \\ 0 & 0 & \alpha_{XR}/r_R & 0 \\ 0 & 0 & 0 & \alpha_{XR}/r_R \end{pmatrix}$$

Formula 10

$$[F] = \begin{pmatrix} \alpha_{\theta F} & 0 & 0 & 0 \\ 0 & \alpha_{\theta F} & 0 & 0 \\ 0 & 0 & \alpha_{\theta R} & 0 \\ 0 & 0 & 0 & \alpha_{\theta R} \end{pmatrix}$$

Formula 11

$$[C] = \begin{pmatrix} 1 & -L_F & 0 & 0 & -W_F & 0 \\ 1 & -L_F & 0 & 0 & W_F & 0 \\ 1 & L_R & 0 & 0 & -W_R & 0 \\ 1 & L_R & 0 & 0 & W_R & 0 \end{pmatrix}$$

Formula 12

Here, $\Delta\omega_1$ is the wheel speed fluctuation amount of the front right wheel 2FR, $\Delta\omega_2$ is the wheel speed fluctuation amount of the front left wheel 2FL, $\Delta\omega_3$ is the wheel speed fluctuation amount of the rear right wheel 2RR, and $\Delta_4$ is the wheel speed fluctuation amount of the rear left wheel 2RL. In other words, the suffix 1 of each variable indicates a value related to the front right wheel 2FR, the suffix 2 indicates a value related to the front left wheel 2FL, the suffix 3 indicates a value related to the rear right wheel 2RR, and the suffix 4 indicates a value related to the rear left wheel 2RL.

The other variables are as follows.

$\omega_1$, $\omega_2$, $\omega_3$, $\omega_4$: tire rotation speed fluctuation amount of each wheel 2 of front right, front left, rear right, rear left.

$\theta_{A1}$, $\theta_{A2}$, $\theta_{A3}$, $\theta_{A4}$: unsprung pitch angle at the position of each wheel 2 of front right, front left, rear right, rear left.

$X_{A1}$, $X_{A2}$, $X_{A3}$, $X_{A4}$: unsprung front-back displacement fluctuation amount of each wheel 2 of front right, front left, rear right, rear left.

$X_{B1}$, $X_{B2}$, $X_{B3}$, $X_{B4}$: front-back displacement fluctuation amount of the sprung portion at the axle position TC of each wheel 2 of front right, front left, rear right, rear left.

$Z_{A1}$, $Z_{A2}$, $Z_{A3}$, $Z_{A4}$: up-down displacement fluctuation amount of the unsprung portion of each wheel 2 of front right, front left, rear right, rear left.

$Z_{B1}$, $Z_{B2}$, $Z_{B3}$, $Z_{B4}$: up-down displacement fluctuation amount of the sprung portion at the axle position TC of each wheel 2 of front right, front left, rear right, rear left.

$Y_{BG}$: left-right displacement fluctuation amount of the gravity center position PG of the sprung portion.

$r_F$: radius of the front wheel 2FR, 2FL.

$r_R$: radius of the rear wheel 2RR, 2RL.

$L_F$: distance in the front and back direction of the vehicle between the axle position TC of the front wheel 2FR, 2FL and the gravity center position PG.

$L_R$: distance in the front and back direction of the vehicle between the axle position TC of the rear wheel 2RR, 2RL and the gravity center position PG.

$W_F$: distance in the left and right direction (vehicle width direction) between the axle position TC of the front wheel 2FR, 2FL and the gravity center position PG.

$W_R$: distance in the left and right direction (vehicle width direction) between the axle position TC of the rear wheel 2RR, 2RL and the gravity center position PG.

$H_F$: distance in the up and down direction between the axle position TC of the front wheel 2FR, 2FL and the gravity center position PG.

$H_R$: distance in the up and down direction between the axle position TC of the rear wheel 2RR, 2RL and the gravity center position PG.

$\alpha_{XF}$: relative displacement amount in the front and back direction of the vehicle of the sprung portion and the unsprung portion at each front wheel 2FR, 2FL per unit stroke amount of the suspension device 10FR, 10FL.

$\alpha_{XR}$: relative displacement amount in the front and back direction of the vehicle of the sprung portion and the unsprung portion at each rear wheel 2RR, 2RL per unit stroke amount of the suspension device 10RR, 10RL.

$\alpha_{\theta F}$: unsprung pitch angle at each front wheel 2FR, 2FL per unit stroke amount of the suspension device 10FR, 10FL.

$\alpha_{74\_R}$: unsprung pitch angle at each rear wheel 2RR, 2RL per unit stroke amount of the suspension device 10RR, 10RL.

The sprung behavior of the vehicle 100 can be expressed with the following [Formula 13]. In the [Formula 13], the vehicle 100 is assumed to be left and right symmetric.

$$\begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} = \begin{pmatrix} \frac{\partial \dot{Z}_{BG}}{\partial Z_1} & 0 & \frac{\partial \dot{Z}_{BG}}{\partial Z_3} & 0 \\ \frac{\partial \dot{\theta}_{BG}}{\partial Z_1} & 0 & \frac{\partial \dot{\theta}_{BG}}{\partial Z_3} & 0 \\ 0 & 0 & 0 & 0 \\ 0 & \frac{\partial \dot{Y}_{BG}}{\partial Z_2} & 0 & \frac{\partial \dot{Y}_{BG}}{\partial Z_4} \\ 0 & \frac{\partial \dot{\varphi}_{BG}}{\partial Z_2} & 0 & \frac{\partial \dot{\varphi}_{BG}}{\partial Z_4} \\ 0 & \frac{\partial \dot{\psi}_{BG}}{\partial Z_2} & 0 & \frac{\partial \dot{\psi}_{BG}}{\partial Z_4} \end{pmatrix} \begin{pmatrix} Z_1 \\ Z_2 \\ Z_3 \\ Z_4 \end{pmatrix} +$$

$$\begin{pmatrix} \frac{\partial \dot{Z}_{BG}}{\partial a} & \frac{\partial \dot{Z}_{BG}}{\partial b} & 0 \\ \frac{\partial \dot{\theta}_{BG}}{\partial a} & \frac{\partial \dot{\theta}_{BG}}{\partial b} & 0 \\ \frac{\partial \dot{X}_{BG}}{\partial a} & \frac{\partial \dot{X}_{BG}}{\partial b} & 0 \\ 0 & 0 & \frac{\partial \dot{Y}_{BG}}{\partial \delta} \\ 0 & 0 & \frac{\partial \dot{\varphi}_{BG}}{\partial \delta} \\ 0 & 0 & \frac{\partial \dot{\psi}_{BG}}{\partial \delta} \end{pmatrix} \begin{pmatrix} a \\ b \\ \delta \end{pmatrix}$$

$$= A \begin{pmatrix} Z_1 \\ Z_2 \\ Z_3 \\ Z_4 \end{pmatrix} + P \begin{pmatrix} a \\ b \\ \delta \end{pmatrix}$$

Formula 13

Here, $Z_1$ to $Z_4$ represent the road surface input. The suffix of the road surface input Z is different from the suffixes of other variables, and is defined as below.

$Z_1$: left-right in-phase input with respect to the front wheel 2FR, 2FL $Z_2$: left-right reverse-phase input with respect to the front wheel 2FR, 2FL $Z_3$: left-right in-phase input with respect to the rear wheel 2RR, 2RL $Z_4$: left-right reverse-phase input with respect to the rear wheel 2RR, 2RL That is, the front wheel in-phase input $Z_1$ is the road surface input that causes the in-phase up-down displacement fluctuation with respect to the front right wheel 2FR and the front left wheel 2FL. For example, the road surface input with which the front right wheel 2FR and the front left wheel 2FL each ride on the projecting portion of the road surface at the same time is the front wheel in-phase input $Z_1$. Furthermore, the input with which the front right wheel 2FR and the front left wheel 2FL each sink into the recessed portion of the road surface at the same time is the front wheel in-phase input $Z_1$. The rear wheel in-phase input $Z_3$ is the road surface input that causes the in-phase up-down displacement fluctuation with respect to the rear right wheel 2RR and the rear left wheel 2RL.

The front wheel reverse-phase input $Z_2$ is the road surface input that causes the up-down displacement fluctuation of reverse phase with respect to the front right wheel 2FR and the front left wheel 2FL. For example, the road surface input with which the front right wheel 2FR rides on the projecting portion of the road surface, and at the same time, the front left wheel 2FL sinks into the recessed portion of the road surface is the front wheel reverse-phase input $Z_2$. The rear wheel reverse-phase input $Z_4$ is the road surface input that causes the up-down displacement fluctuation of reverse-phase with respect to the rear right wheel 2RR and the rear left wheel 2RL.

Other variables are as follows.

Transfer function related to road surface input $\partial Z_{BG}/\partial Z_i$: transfer function of the up-down displacement of the gravity center position PG with respect to the road surface input $Z_i$ (i=1, 2, 3, 4).

$\partial \theta_{BG}/\partial Z_i$: transfer function of the sprung pitch angle with respect to the road surface input $Z_i$.

$\partial Y_{BG}/\partial Z_i$: transfer function of the left-right displacement of the sprung gravity center position with respect to the road surface input $Z_i$.

$\partial \phi_{BG}/\partial Z_{Bi}$: transfer function of the sprung roll angle with respect to the road surface input $Z_i$.

$\partial \Psi_{BG}/\partial Z_i$: transfer function of the sprung yaw angle with respect to the road surface input $Z_i$.

$\partial Z_{AF}/\partial Z_i$: transfer function of the up-down displacement of the unsprung portion of the front wheel 2FR, 2FL with respect to the road surface input $Z_i$.

$\partial Z_{AR}/\partial Z_i$: transfer function of the up-down displacement of the unsprung portion of the rear wheel 2RR, 2RL with respect to the road surface input Z.

Transfer Function Related to Brake/Drive Input $\partial Z_{BG}/\partial a$: transfer function of the up-down displacement of the sprung gravity center position PG with respect to the accelerator input.

$\partial Z_{BG}/\partial b$: transfer function of the up-down displacement of the sprung gravity center position PG with respect to the brake input.

$\partial Z_{BG}/\partial a$: transfer function of the sprung pitch angle with respect to the accelerator input.

$\partial Z_{BG}/\partial b$: transfer function of the sprung pitch angle with respect to the brake input.

$\partial X_{BG}/\partial a$: transfer function of the front-back displacement of the sprung gravity center position PG with respect to the accelerator input.

$\partial X_{BG}/\partial b$: transfer function of the front-back displacement of the sprung gravity center position PG with respect to the brake input.

Transfer Function Related to Steering Input $\partial Y_{BG}/\partial \delta$: transfer function of the left-right displacement of the sprung gravity center position PG with respect to the steering input.

$\partial \phi_{BG}/\partial \delta$: transfer function of the sprung roll angle with respect to the steering input.

$\partial \Psi_{BG}/\partial \delta$: transfer function of the sprung yaw angle with respect to the steering input.

The first term on the right side of the [Formula 13] indicates the sprung behavior by the road surface input, and the second term on the right side indicates the sprung behavior by the operation input. The matrix [A] of the first term on the right side is illustrated in [Formula 14] below, and the matrix [P] of the second term on the right side is illustrated in [Formula 15].

$$A = \begin{pmatrix} \frac{\partial \dot{Z}_{BG}}{\partial Z_1} & 0 & \frac{\partial \dot{Z}_{BG}}{\partial Z_3} & 0 \\ \frac{\partial \dot{\theta}_{BG}}{\partial Z_1} & 0 & \frac{\partial \dot{\theta}_{BG}}{\partial Z_3} & 0 \\ 0 & 0 & 0 & 0 \\ 0 & \frac{\partial \dot{Y}_{BG}}{\partial Z_2} & 0 & \frac{\partial \dot{Y}_{BG}}{\partial Z_4} \\ 0 & \frac{\partial \dot{\varphi}_{BG}}{\partial Z_2} & 0 & \frac{\partial \dot{\varphi}_{BG}}{\partial Z_4} \\ 0 & \frac{\partial \dot{\psi}_{BG}}{\partial Z_2} & 0 & \frac{\partial \dot{\psi}_{BG}}{\partial Z_4} \end{pmatrix}$$ Formula 14

$$P = \begin{pmatrix} \frac{\partial \dot{Z}_{BG}}{\partial a} & \frac{\partial \dot{Z}_{BG}}{\partial b} & 0 \\ \frac{\partial \dot{\theta}_{BG}}{\partial a} & \frac{\partial \dot{\theta}_{BG}}{\partial b} & 0 \\ \frac{\partial \dot{X}_{BG}}{\partial a} & \frac{\partial \dot{X}_{BG}}{\partial b} & 0 \\ 0 & 0 & \frac{\partial \dot{Y}_{BG}}{\partial \delta} \\ 0 & 0 & \frac{\partial \dot{\varphi}_{BG}}{\partial \delta} \\ 0 & 0 & \frac{\partial \dot{\psi}_{BG}}{\partial \delta} \end{pmatrix}$$ Formula 15

For the in-phase road surface inputs $Z_1$, $Z_3$, it is assumed that the up-down displacement and the pitching of the gravity center position PG occur, but the behavior in the lateral direction, the roll direction, and the yaw direction does not occur. Thus, in the matrix [A], an element that indicates the relationship between the in-phase road surface inputs $Z_1$, $Z_3$ and the speed in the lateral direction, the roll direction, and the yaw direction is set to zero. Furthermore, for the reverse-phase road surface inputs $Z_2$, $Z_4$, it is assumed that the behavior in the lateral direction, the roll direction, and the yaw direction occurs, but the up-down displacement and the pitching of the gravity center position PG do not occur. Thus, in the matrix [A], an element that indicates the relationship between the reverse-phase road surface inputs $Z_2$, $Z_4$ and the up-down fluctuating speed and the pitch angular speed of the gravity center position PG is set to zero.

In the accelerator operation and the brake operation, it is assumed that the behavior in the lateral direction, the roll direction, and the yaw direction does not occur. Thus, in the matrix [P], an element that indicates the relationship between the drive operation amount a and the brake operation amount b, and the speed in the lateral direction, the roll direction, and the yaw direction is set to zero. It is assumed that the displacement of the gravity center position in the up and down direction and the front and back direction and the pitching do not occur by the steering operation. Thus, in the matrix [P], an element that indicates the relationship between the steering operation amount δ and the up-down fluctuating speed, the front-back fluctuating speed, and the pitch angular speed of the gravity center position PG is set to zero.

The unsprung behavior of the vehicle 100 can be expressed with the following [Formula 16]. In the [Formula 16], the vehicle 100 is assumed to be left and right symmetrical. The right side of the [Formula 16] indicates the unsprung behavior by the road surface input. In the present embodiment, the unsprung behavior by the operation input is assumed to not occur. The matrix [B] on the right side of the [Formula 16] is illustrated in [Formula 17] below.

$$\begin{pmatrix} \dot{Z}_{A1} \\ \dot{Z}_{A2} \\ \dot{Z}_{A3} \\ \dot{Z}_{A4} \end{pmatrix} = \begin{pmatrix} \frac{\partial \dot{Z}_{AF}}{\partial Z_1} & -\frac{\partial \dot{Z}_{AF}}{\partial Z_2} & 0 & 0 \\ \frac{\partial \dot{Z}_{AF}}{\partial Z_1} & \frac{\partial \dot{Z}_{AF}}{\partial Z_2} & 0 & 0 \\ 0 & 0 & \frac{\partial \dot{Z}_{AR}}{\partial Z_3} & -\frac{\partial \dot{Z}_{AR}}{\partial Z_4} \\ 0 & 0 & \frac{\partial \dot{Z}_{AR}}{\partial Z_3} & \frac{\partial \dot{Z}_{AR}}{\partial Z_4} \end{pmatrix} \begin{pmatrix} Z_1 \\ Z_2 \\ Z_3 \\ Z_4 \end{pmatrix}$$ Formula 16

$$= B \begin{pmatrix} Z_1 \\ Z_2 \\ Z_3 \\ Z_4 \end{pmatrix}$$

$$B = \begin{pmatrix} \frac{\partial \dot{Z}_{AF}}{\partial Z_1} & -\frac{\partial \dot{Z}_{AF}}{\partial Z_2} & 0 & 0 \\ \frac{\partial \dot{Z}_{AF}}{\partial Z_1} & \frac{\partial \dot{Z}_{AF}}{\partial Z_2} & 0 & 0 \\ 0 & 0 & \frac{\partial \dot{Z}_{AR}}{\partial Z_3} & -\frac{\partial \dot{Z}_{AR}}{\partial Z_4} \\ 0 & 0 & \frac{\partial \dot{Z}_{AR}}{\partial Z_3} & \frac{\partial \dot{Z}_{AR}}{\partial Z_4} \end{pmatrix}$$ Formula 17

The [Formula 13] and the [Formula 16] are substituted to the [Formula 7] to obtain [Formula 18]. The [Formula 18] is separated to the element caused by the road surface input and the element caused by the operation input, whereby [Formula 19] is obtained.

$$\begin{pmatrix} \Delta \omega_1 \\ \Delta \omega_2 \\ \Delta \omega_3 \\ \Delta \omega_4 \end{pmatrix} = \{(D-G)-(E-F)C\}\left[A\begin{pmatrix} Z_1 \\ Z_2 \\ Z_3 \\ Z_4 \end{pmatrix} + P\begin{pmatrix} a \\ b \\ \delta \end{pmatrix}\right] + (E-F)B\begin{pmatrix} Z_1 \\ Z_2 \\ Z_3 \\ Z_4 \end{pmatrix}$$ Formula 18

$$\begin{pmatrix} \Delta \omega_1 \\ \Delta \omega_2 \\ \Delta \omega_3 \\ \Delta \omega_4 \end{pmatrix} = [\{(D-G)-(E-F)C\}A + (E-F)B]\begin{pmatrix} Z_1 \\ Z_2 \\ Z_3 \\ Z_4 \end{pmatrix} + [(D-G)-(E-F)C]P\begin{pmatrix} a \\ b \\ \delta \end{pmatrix}$$ Formula 19

The first term on the right side of the [Formula 19] is a term indicating the wheel speed fluctuation amount Δω by the behavior of the sprung portion and the unsprung portion caused by the road surface input Z. The second term on the right side of the [Formula 19] is a term indicating the wheel speed fluctuation amount Δω by the sprung behavior caused by the operation input. When the wheel speed fluctuation amount Δω by the sprung behavior caused by the operation input is removed from the [Formula 19], the wheel speed fluctuation amount $\Delta\omega'$ caused by the road surface input remains, as indicated in [Formula 20].

$$\begin{pmatrix} \Delta\omega'_1 \\ \Delta\omega'_2 \\ \Delta\omega'_3 \\ \Delta\omega'_4 \end{pmatrix} = \begin{pmatrix} \Delta\omega_1 \\ \Delta\omega_2 \\ \Delta\omega_3 \\ \Delta\omega_4 \end{pmatrix} - [(D-G) - (E-F)C]P\begin{pmatrix} a \\ b \\ \delta \end{pmatrix} \quad \text{Formula 20}$$

$$= [\{(D-G) - (E-F)C\}A + (E-F)B]\begin{pmatrix} Z_1 \\ Z_2 \\ Z_3 \\ Z_4 \end{pmatrix}$$

Here, $\Delta\omega_1'$ indicates the wheel speed fluctuation amount of the front right wheel 2FR caused by the road surface input. Similarly, $\Delta\omega_2'$ indicates the wheel speed fluctuation amount caused by the road surface input of the front left wheel 2FL, $\Delta\omega_3'$ indicates that of the rear right wheel 2RR, and $\Delta\omega_4'$ indicates that of the rear left wheel 2RL.

[Formula 21] is obtained from the [Formula 20]. Therefore, if the wheel speed fluctuation amount $\Delta\omega'$ caused by the road surface input of each wheel 2 can be calculated, the road surface input $Z_i$ can be estimated by the [Formula 21].

$$\begin{pmatrix} Z_1 \\ Z_2 \\ Z_3 \\ Z_4 \end{pmatrix} = [\{(D-G) - (E-F)C\}A + (E-F)B]^{-1}\begin{pmatrix} \Delta\omega'_1 \\ \Delta\omega'_2 \\ \Delta\omega'_3 \\ \Delta\omega'_4 \end{pmatrix} \quad \text{Formula 21}$$

The sprung speed can be estimated by [Formula 22] based on the estimated road surface input $Z_i$. The relative speed of the unsprung portion with respect to the sprung portion can be estimated by [Formula 23] based on the estimated road surface input $Z_i$.

$$\begin{pmatrix} \dot{Z}_{BG} \\ \dot{\theta}_{BG} \\ \dot{X}_{BG} \\ \dot{Y}_{BG} \\ \dot{\varphi}_{BG} \\ \dot{\psi}_{BG} \end{pmatrix} = A\begin{pmatrix} Z_1 \\ Z_2 \\ Z_3 \\ Z_4 \end{pmatrix} \quad \text{Formula 22}$$

$$= A[\{(D-G)-(E-F)C\}A + (E-F)B]^{-1}\begin{pmatrix} \Delta\omega'_1 \\ \Delta\omega'_2 \\ \Delta\omega'_3 \\ \Delta\omega'_4 \end{pmatrix}$$

$$\begin{pmatrix} \dot{Z}_{A1} - \dot{Z}_{B1} \\ \dot{Z}_{A2} - \dot{Z}_{B2} \\ \dot{Z}_{A3} - \dot{Z}_{B3} \\ \dot{Z}_{A4} - \dot{Z}_{B4} \end{pmatrix} = \begin{pmatrix} \dot{Z}_{A1} \\ \dot{Z}_{A2} \\ \dot{Z}_{A3} \\ \dot{Z}_{A4} \end{pmatrix} - \begin{pmatrix} \dot{Z}_{B1} \\ \dot{Z}_{B2} \\ \dot{Z}_{B3} \\ \dot{Z}_{B4} \end{pmatrix} \quad \text{Formula 23}$$

$$= \begin{pmatrix} \dot{Z}_{A1} \\ \dot{Z}_{A2} \\ \dot{Z}_{A3} \\ \dot{Z}_{A4} \end{pmatrix} - C\begin{pmatrix} \dot{Z}_{BG} \\ \dot{\theta}_{BG} \\ \dot{X}_{BG} \\ \dot{\varphi}_{BG} \\ \dot{\psi}_{BG} \end{pmatrix} S$$

$$= B\begin{pmatrix} Z_1 \\ Z_2 \\ Z_3 \\ Z_4 \end{pmatrix} - CA\begin{pmatrix} Z_1 \\ Z_2 \\ Z_3 \\ Z_4 \end{pmatrix}$$

$$= (B - CA)\left[\left\{\begin{matrix} (D-G)- \\ (E-F)C \end{matrix}\right\}A + (E-F)B\right]^{-1}\begin{pmatrix} \Delta\omega'_1 \\ \Delta\omega'_2 \\ \Delta\omega'_3 \\ \Delta\omega'_4 \end{pmatrix}$$

The correspondence relationship, and the like between the estimating method of the vehicle state by the vehicle state estimating device 101 according to the present embodiment and the theoretical formula will now be described. The estimating unit 21a based on the drive operation of the first state amount estimating unit 21 corresponds to the first column of the matrix [P]. The estimating unit 21b based on the brake operation corresponds to the second column of the matrix [P], and the estimating unit 21c based on the steering operation corresponds to the third column. In the present embodiment, the value of each element of the matrix [P] is stored in the vehicle state estimating device 101 in advance as a specification value of the vehicle 100.

The first state amount estimating unit 21 has a function of carrying out the estimation of the second term on the right side of the [Formula 13]. The first state amount estimating unit 21 estimates the up-down displacement $Z_{BG}$, the front-back displacement $X_{BG}$, and the pitch angle $\theta_{BG}$ of the sprung gravity center position PG based on the drive operation amount a and the brake operation amount b. The first state amount estimating unit 21 estimates the left-right displacement $Y_{BG}$, the roll angle $\phi_{BG}$ and the yaw angle $\Psi_{BG}$ of the sprung gravity center position PG based on the steering operation amount $\delta$.

The estimating unit 21a based on the drive operation calculates the speed component caused by the drive operation amount a for each of the six directions of the sprung speed, that is, the up-down direction ($Z_{BG}$), the sprung pitch angle direction ($\theta_{BG}$), the vehicle front-back direction ($X_{BG}$), the vehicle left-right direction ($Y_{BG}$) the sprung roll angle direction ($\phi_{BG}$) and the sprung yaw angle direction ($\Psi_{BG}$). As apparent from the elements of the matrix [P], the estimating unit 21a based on the drive operation of the present embodiment estimates the speed component in substantially three directions of the up-down direction ($Z_{BG}$), the sprung pitch angle direction ($\theta_{BG}$) and the vehicle front-back direction ($X_{BG}$).

The estimating unit 21b based on the brake operation calculates the speed component caused by the brake operation amount b for the six directions of the sprung speed. The estimating unit 21b based on the brake operation of the present embodiment estimates the speed component in substantially three directions of the up-down direction ($Z_{BG}$), the sprung pitch angle direction ($\theta_{BG}$) and the vehicle front-back direction ($X_{BG}$). The estimating unit 21c based on the steering operation calculates the speed component caused by the steering operation amount δ for the six directions of the sprung speed. The estimating unit 21c based on the steering operation of the present embodiment estimates the speed component in substantially three directions of the vehicle left-right direction ($Y_{BG}$), the sprung roll angle direction ($\phi_{BG}$) and the sprung yaw angle direction ($\Psi_{BG}$). The adding unit 21d adds the values of the speed components calculated by each estimating unit 21a, 21b, and 21c for the six directions of the sprung speed.

The first fluctuation estimating unit 22 corresponds to [(D−G)−(E−F)C] of the second term on the right side of the [Formula 19]. That is, the first fluctuation estimating unit 22 of the present embodiment estimates a component caused by the operation input of the wheel speed fluctuation amount Δω based on a correspondence relationship (transfer function) between the sprung behavior by the operation input and the wheel speed fluctuation amount Δω of each wheel 2. In other words, the first fluctuation estimating unit 22 estimates the wheel speed fluctuation amount caused by the operation input based on the up-down displacement, the front-back displacement, and the pitch angle of the sprung gravity center estimated based on the brake operation amount b and the drive operation amount a, and the left-right displacement, the roll angle, and the yaw angle of the sprung gravity center estimated based on the steering operation amount δ. The transfer function used by the first fluctuation estimating unit 22 is, for example, stored in advance in the vehicle state estimating device 101.

The estimating unit 27a based on the drive force calculates the wheel speed fluctuation amounts $\Delta\omega_1$ to $\Delta\omega_4$ of the four wheels based on the correspondence relationship (transfer function) between the wheel speed fluctuation amount Δω of each wheel 2 and the drive operation amount a, for example. The estimating unit 27b based on the brake force calculates the wheel speed fluctuation amounts $\Delta\omega_1$ to $\Delta\omega_4$ of the four wheels based on the correspondence relationship (transfer function) between the wheel speed fluctuation amount Δω of each wheel 2 and the brake operation amount b, for example. The transfer function used by the wheel speed fluctuation estimating unit 27 by the brake/drive force is, for example, stored in advance in the vehicle state estimating device 101. The adding unit 27c adds the wheel speed fluctuation amount Δω calculated by the estimating unit 27a based on the drive force and the wheel speed fluctuation amount Δω calculated by the estimating unit 27b based on the brake force for each of the wheels 2FR, 2FL, 2RR, 2RL.

The wheel speed fluctuation amount Δω calculated based on the detected wheel speed of each wheel 2 is input to the second fluctuation estimating unit 23. The wheel speed fluctuation amounts $\Delta\omega_1$, $\Delta\omega_2$, $\Delta\omega_3$, $\Delta\omega_4$ are fluctuating components of the wheel speed detected by the wheel speed detection units 4FR, 4FL, 4RR, 4RL, respectively. For example, the fluctuation amount from the rotation speed corresponding to the current vehicle speed in the rotation speed detected by the wheel speed detection unit 4 is input to the second fluctuation estimating unit 23 as the wheel speed fluctuation amount Δω.

The second fluctuation estimating unit 23 calculates the actual wheel speed fluctuation amount by excluding the wheel speed fluctuation amount by the brake/drive force estimated by the wheel speed fluctuation estimating unit 27 by the brake/drive force from the wheel speed fluctuation amount Δω of each wheel 2. The second fluctuation estimating unit 23 outputs the estimated value of the actual wheel speed fluctuation amount to the third fluctuation estimating unit 24.

The third fluctuation estimating unit 24 estimates the wheel speed fluctuation amount Δω' caused by the road surface input by removing the wheel speed fluctuation amount caused by the operation input acquired by the first fluctuation estimating unit 22 from the actual wheel speed fluctuation amount acquired by the second fluctuation estimating unit 23.

The road surface input estimating unit 25a calculates the road surface input $Z_i$ based on the wheel speed fluctuation amount Δω' caused by the road surface input acquired from the third fluctuation estimating unit 24. The road surface input estimating unit 25a estimates, for example, the road surface input $Z_i$ based on the correspondence relationship (transfer function) between the wheel speed fluctuation amount Δω' caused by the road surface input and the road surface input $Z_i$. The road surface input estimating unit 25a of the present embodiment, for example, estimates the road surface input $Z_i$ based on the [Formula 21]. The transfer function used by the road surface input estimating unit 25a is, for example, stored in advance in the vehicle state estimating device 101.

The sprung state amount estimating unit 25b estimates the sprung speed based on the road surface input $Z_i$ acquired from the road surface input estimating unit 25a. The sprung state amount estimating unit 25b estimates, for example, the sprung speed based on the correspondence relationship (transfer function) between the sprung speed in six directions and the road surface input $Z_i$. The sprung state amount estimating unit 25b of the present embodiment, for example, estimates the sprung speed based on the [Formula 22]. The transfer function used by the sprung state amount estimating unit 25b is, for example, stored in advance in the vehicle state estimating device 101.

The relative speed estimating unit 25c estimates the relative speed of the sprung portion and the unsprung portion based on the road surface input $Z_i$ acquired from the road surface input estimating unit 25a. The relative speed estimating unit 25c estimates, for example, the relative speed based on the correspondence relationship (transfer function) between the relative speed in the up and down direction of the sprung portion and the unsprung portion, and the road surface input $Z_i$. The relative speed estimating unit 25c of the present embodiment calculates, for example, the relative speed in the up and down direction of the sprung portion and the unsprung portion for each of the four wheels based on the [Formula 23]. The transfer function used by the relative speed estimating unit 25c is, for example, stored in advance in the vehicle state estimating device 101.

The third state amount estimating unit 26 adds the sprung speed estimated by the sprung state amount estimating unit 25b and the sprung speed calculated by the adding unit 21d to estimate the total sprung speed. The sprung speed estimated by the sprung state amount estimating unit 25b is an estimated value of the sprung state amount caused by the road surface input, and the sprung speed calculated by the adding unit 21d is an estimated value of the sprung state amount caused by the operation input. Therefore, the total sprung speed indicates the total sprung state amount in which the sprung state amount caused by the operation input and the sprung state amount caused by the road surface input are added.

The estimation result of the vehicle state estimating device 101 according to the present embodiment will be described with reference to FIG. 10. In FIG. 10, the horizontal axis indicates time [sec], and the vertical axis indicates the relative speed [mm/s] in the up and down direction of the unsprung portion and the sprung portion. In FIG. 10, the broken line indicates the actual measurement value of the relative speed of the unsprung portion and the sprung portion, and the solid line indicates the estimated value of the relative speed of the unsprung portion and the sprung portion estimated by the vehicle state estimating device 101 according to the embodiment.

As apparent from FIG. 10, the estimated value (solid line) of the relative speed is a value close to the actual measurement value (broken line). The estimated value of the relative speed accurately estimates the timing at which the plus/minus of the value of the relative speed switches. When controlling the suspension device 10, it is desirable the plus/minus of the relative speed is estimated with satisfactory accuracy. If the plus/minus of the relative speed is not accurately estimated, the attenuating property corresponding to the contracting operation may be set although the suspension device 10 is extending, or on the other hand, the attenuating property corresponding to the extending operation may be set although the suspension device 10 is contracting. Thus, unless the actual operation of the suspension device 10 and the attenuating property match, the comfortableness in riding and the vehicle behavior may be affected and the drivability may become lower.

According to the vehicle state estimating device 101 of the present embodiment, the plus/minus, or the absolute value of the relative speed of the unsprung portion and the sprung portion can be accurately estimated. This is because the sprung speed, and the relative speed of the unsprung portion and the sprung portion are estimated based on the wheel speed fluctuation amount $\Delta\omega'$ caused by the road surface input $Z_i$ which is obtained by once removing the wheel speed fluctuation amount $\Delta\omega$ caused by the operation input, for example. The behavior of the unsprung portion is mainly caused by the road surface input. The behavior of the sprung portion, on the other hand, contains a component caused by the operation input and a component caused by the road surface input. The vehicle state estimating device 101 according to the present embodiment can accurately estimate the sprung speed and the relative speed of the sprung portion and the unsprung portion by estimating the state amount based on the wheel speed fluctuation amount $\Delta\omega'$ caused by the road surface input $Z_i$ obtained by removing the wheel speed fluctuation amount caused by the operation input.

The vehicle state estimating device 101 according to the present embodiment has an advantage in that the estimation accuracy is satisfactory since the estimated value and the detection value used for the estimation are both speed. For example, instead of the estimating method of the present embodiment, consideration can be made in estimating the sprung speed and the relative speed of the unsprung portion and the sprung portion based on the stroke amount (displacement) of the suspension device 10. In this case, the detected stroke amount needs to be differentiated to be converted to speed. The differentiation leads to lowering in accuracy since the phase is advanced.

On the other hand, the vehicle state estimating device 101 of the present embodiment estimates the sprung speed, and the like based on the detected speed, whereby the problem of the lowering in accuracy by differentiation can be avoided. Furthermore, the detection result of the existing wheel speed detection unit 4 that detects the vehicle speed, and the like can be used to estimate the sprung speed, and the like, and thus increase in the device to be installed in the vehicle 100 can be suppressed. Moreover, the vehicle state can be estimated using the existing wheel speed detection unit 4.

Figure 11:
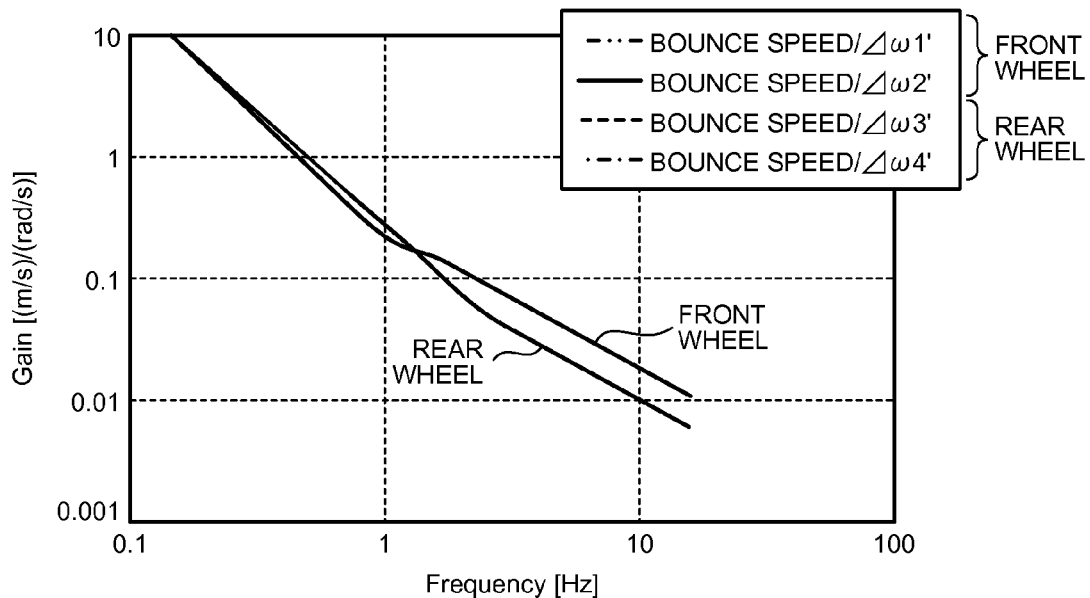
FIG. 11 is a view illustrating frequency characteristics of a gain of a bounce speed with respect to the wheel speed fluctuation amount.
Figure 12:
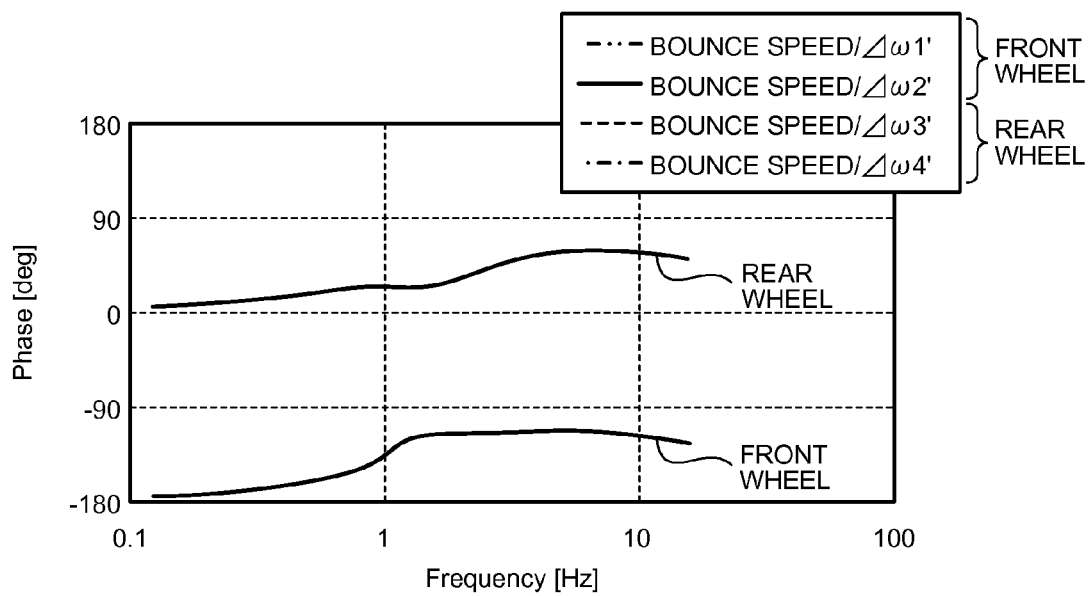
FIG. 12 is a view illustrating frequency characteristics of a phase of the bounce speed having a phase of a road surface input as a reference.

Calculation Method of the Sprung Speed One example of the result estimated by the vehicle state estimating device 101 of the present embodiment and the calculation method of the sprung speed based on the estimation result will be specifically described with reference to FIG. 11 to FIG. 16. FIG. 11 is a view illustrating frequency characteristics of a gain of a bounce speed with respect to the wheel speed fluctuation amount, and FIG. 12 is a view illustrating frequency characteristics of a phase of the bounce speed having the phase of the road surface input as a reference. The bounce speed is, for example, a speed in the up and down direction of the gravity center position PG of the sprung portion.

In both FIG. 11 and FIG. 12, the horizontal axis indicates the frequency [Hz] of the road surface input. The vertical axis of FIG. 11 indicates the gain [(m/s)/(rad/s)] of the bounce speed with respect to the wheel speed fluctuation amount $\Delta\omega$ of each wheel 2. The vertical axis of FIG. 12 indicates the phase [deg] of the bounce speed having the phase of the road surface input to each wheel 2 as a reference. For example, describing a case in which the road surface input of 1 Hz is made, the value obtained by multiplying the gain of about 0.2 to the wheel speed fluctuation amount $\Delta\omega$ becomes the magnitude of the bounce speed according to FIG. 11. Furthermore, when obtaining the phase of the bounce speed according to FIG. 12, it is apparent that the phase is a value in which the phase is advanced by about 20 [deg] with respect to the road surface input to the rear wheel.

With respect to all the wheels 2, a product of the wheel speed fluctuation amount $\Delta\omega$ and the gain is obtained, and such products are added for the four wheels for each phase to obtain the bounce speed of the body 3. The vehicle state estimating device 101 can obtain the frequency characteristics of the gain with respect to the wheel speed fluctuation amount $\Delta\omega$ and the frequency characteristics of the phase having the phase of the road surface input as the reference not only for the bounce speed but also for the front-back direction speed and the left-right direction speed of the gravity center position PG of the sprung portion. A product of the wheel speed fluctuation amount $\Delta\omega$ and the gain is also obtained for the front-back direction speed and the left-right direction speed of the gravity center position PG of the sprung portion and such products are added for the four wheels to obtain the front-back direction speed and the left-right direction speed of the body 3.

Figure 13:
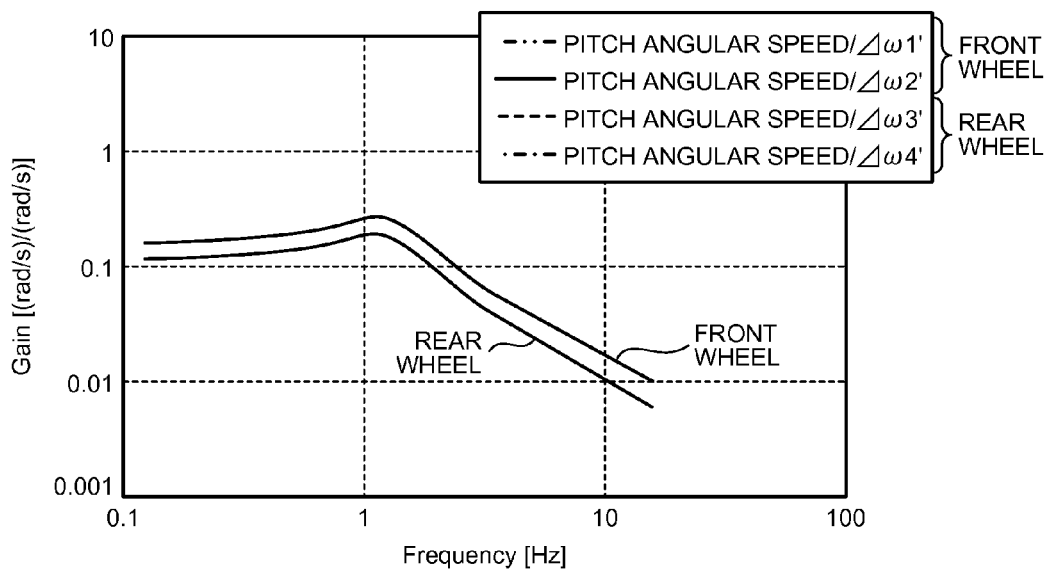
FIG. 13 is a view illustrating frequency characteristics of a gain of a sprung pitch angular speed with respect to the wheel speed fluctuation amount.
Figure 14:
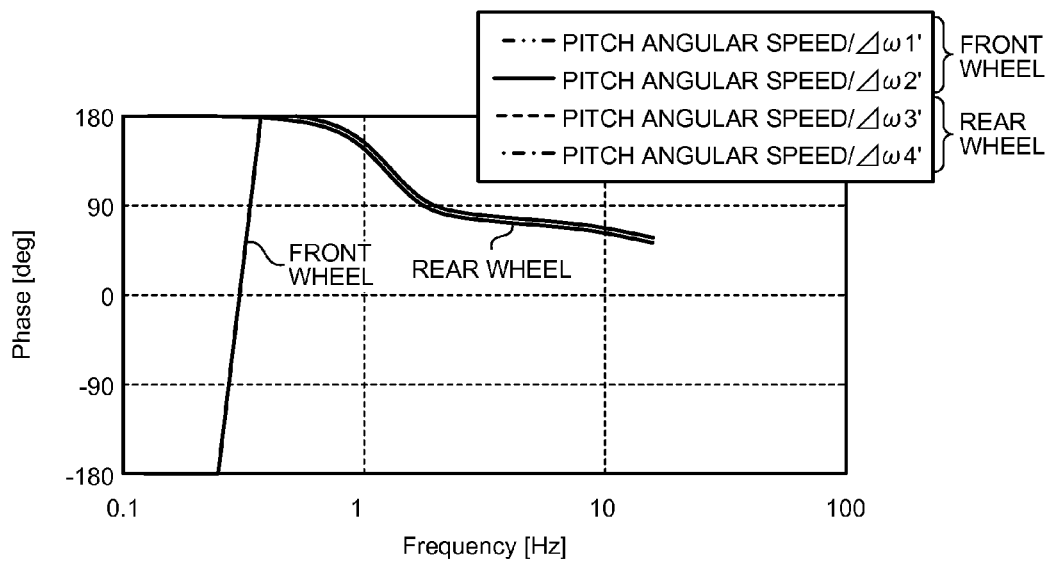
FIG. 14 is a view illustrating frequency characteristics of a phase of the sprung pitch angular speed having the phase of the road surface input as a reference.

FIG. 13 is a view illustrating frequency characteristics of a gain of the sprung pitch angular speed with respect to the wheel speed fluctuation amount, and FIG. 14 is a view illustrating frequency characteristics of a phase of the sprung pitch angular speed having the phase of the road surface input as a reference. The horizontal axes of FIG. 13 and FIG. 14 indicate the frequency of the road surface input. The vertical axis of FIG. 13 indicates the gain [(rad/s)/(rad/s)] of the sprung pitch angular speed with respect to the wheel speed fluctuation amount $\Delta\omega$ of each wheel 2. The vertical axis of FIG. 14 indicates the phase of the sprung pitch angular speed having the phase of the road surface input to each wheel 2 as a reference.

Figure 15:
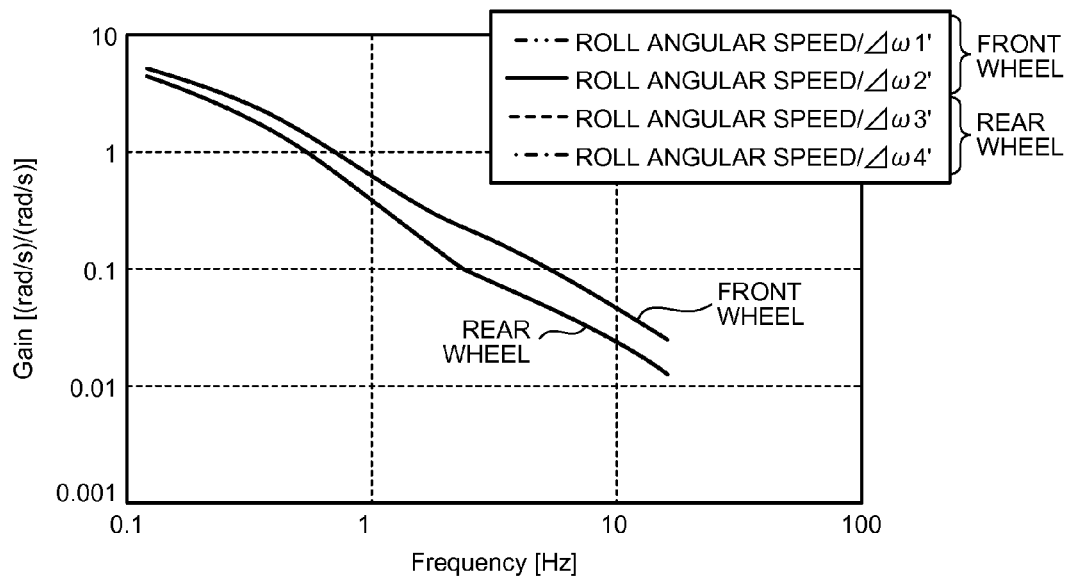
FIG. 15 is a view illustrating frequency characteristics of a gain of a sprung roll angular speed with respect to the wheel speed fluctuation amount.
Figure 16:
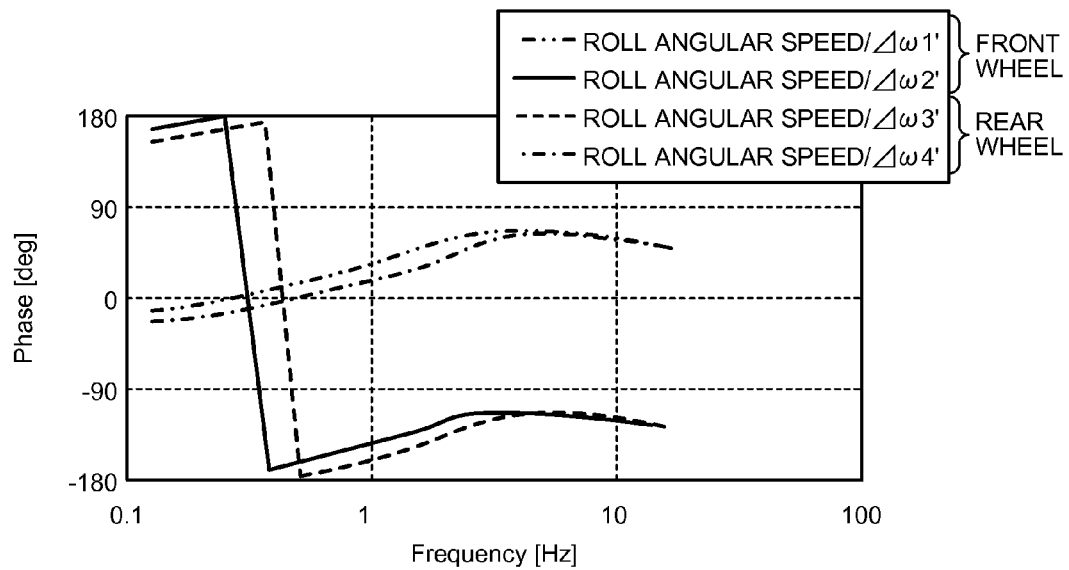
FIG. 16 is a view illustrating frequency characteristics of a phase of the sprung roll angular speed having the phase of the road surface input as a reference.

FIG. 15 is a view illustrating frequency characteristics of the gain of the sprung roll angular speed with respect to the wheel speed fluctuation amount, and FIG. 16 is a view illustrating frequency characteristics of the phase of the sprung roll angular speed having the phase of the road surface input as a reference. The horizontal axes of FIG. 15 and FIG. 16 indicate the frequency of the road surface input. The vertical axis of FIG. 15 indicates the gain [(rad/s)/(rad/s)] of the sprung roll angular speed with respect to the wheel speed fluctuation amount $\Delta\omega$ of each wheel 2. The vertical axis of FIG. 16 indicates the phase of the sprung roll angular speed having the phase of the road surface input to each wheel 2 as a reference.

The vehicle state estimating device 101 can obtain the frequency characteristics of the gain with respect to the wheel speed fluctuation amount Δω and the frequency characteristics of the phase having the phase of the road surface input as the reference not only for the pitch angular speed and the roll angular speed but also for the yaw angular speed. With respect to such angular speeds as well, a product of the wheel speed fluctuation amount Δω and the gain is obtained for all the wheels 2 and such products are added for the four wheels to obtain the pitch angular speed, the roll angular speed, the yaw angular speed, and the like.

The sprung state amount estimating unit 25b according to the present embodiment estimates the sprung speed through the methods described with reference to FIG. 11 to FIG. 16, for example.

Calculation Method of the Relative Speed

Figure 17:
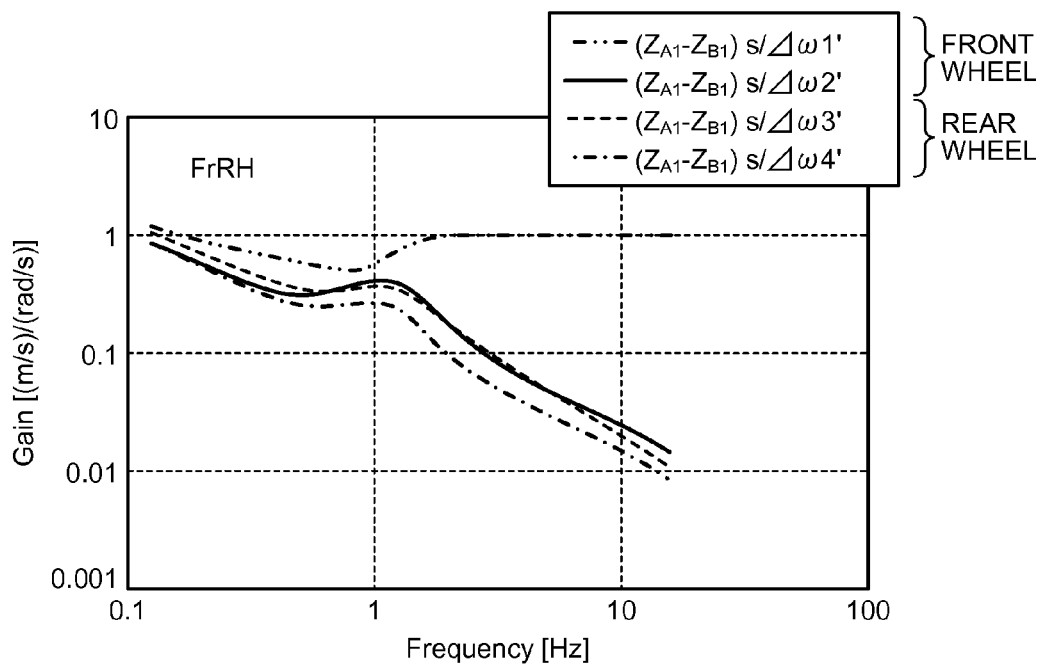
FIG. 17 is a view illustrating frequency characteristics of a gain of a front right relative speed with respect to the wheel speed fluctuation amount.
Figure 18:
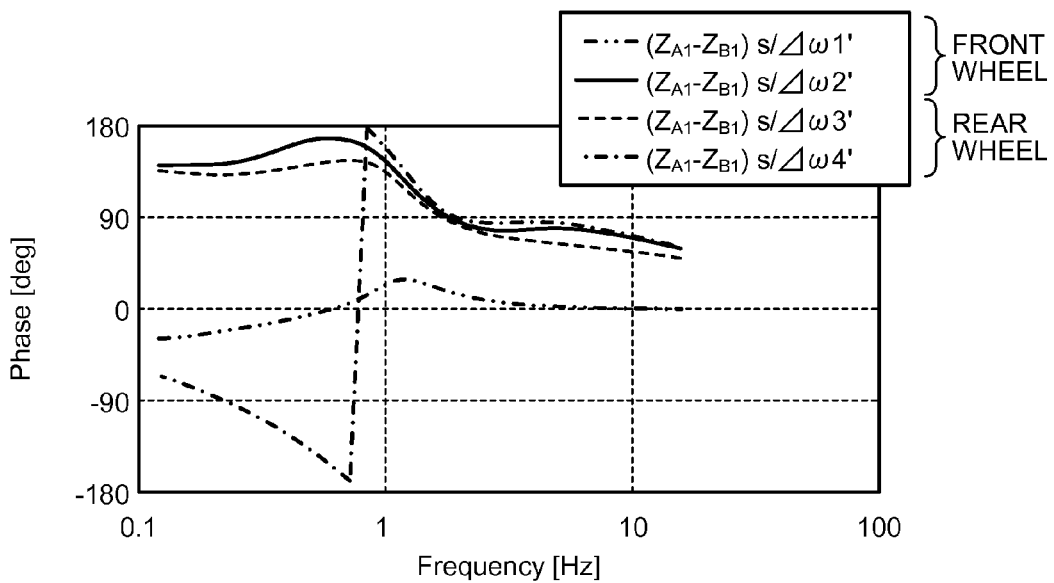
FIG. 18 is a view illustrating frequency characteristics of a phase of the front right relative speed having the phase of the road surface input as a reference.

One example of the result estimated by the vehicle state estimating device 101 of the present embodiment and the calculation method of the relative speed of the sprung portion and the unsprung portion based on the estimation result will be specifically described with reference to FIG. 17 to FIG. 24. The horizontal axes in FIG. 17 to FIG. 24 indicate the frequency of the road surface input. FIG. 17 and FIG. 18 relate to the relative speed of the sprung portion and the unsprung portion of the front right wheel 2FR (hereinafter simply referred to as "front right relative speed"). FIG. 17 is a view illustrating frequency characteristics of a gain of the front right relative speed with respect to the wheel speed fluctuation amount, and FIG. 18 is a view illustrating frequency characteristics of a phase of the front right relative speed having the phase of the road surface input as a reference.

The vertical axis of FIG. 17 indicates the gain [(m/s)/(rad/s)] of the front right relative speed with respect to the wheel speed fluctuation amount Δω of each wheel 2. The vertical axis of FIG. 18 indicates the phase of the front right relative speed having the phase of the road surface input to each wheel 2 as a reference. As apparent from FIG. 17, the wheel speed fluctuation amounts $\Delta\omega_2'$, $\Delta\omega_3'$, $\Delta\omega_4'$ caused by the road surface input of the other wheels 2FL, 2RR, 2RL each influence the front right relative speed. In the low frequency region in which the frequency of the road surface input is lower than 1 [Hz], the influence of the wheel speed fluctuation amount $\Delta\omega_2'$, $\Delta\omega_3'$, $\Delta\omega_4'$ of the other wheels 2FL, 2RR, 2RL on the front right relative speed is larger than in the region of higher frequency.

With respect to all the wheels 2, a product of the wheel speed fluctuation amount Δω and the gain is obtained, and such products are added for the four wheels to obtain the front right relative speed.

Figure 19:
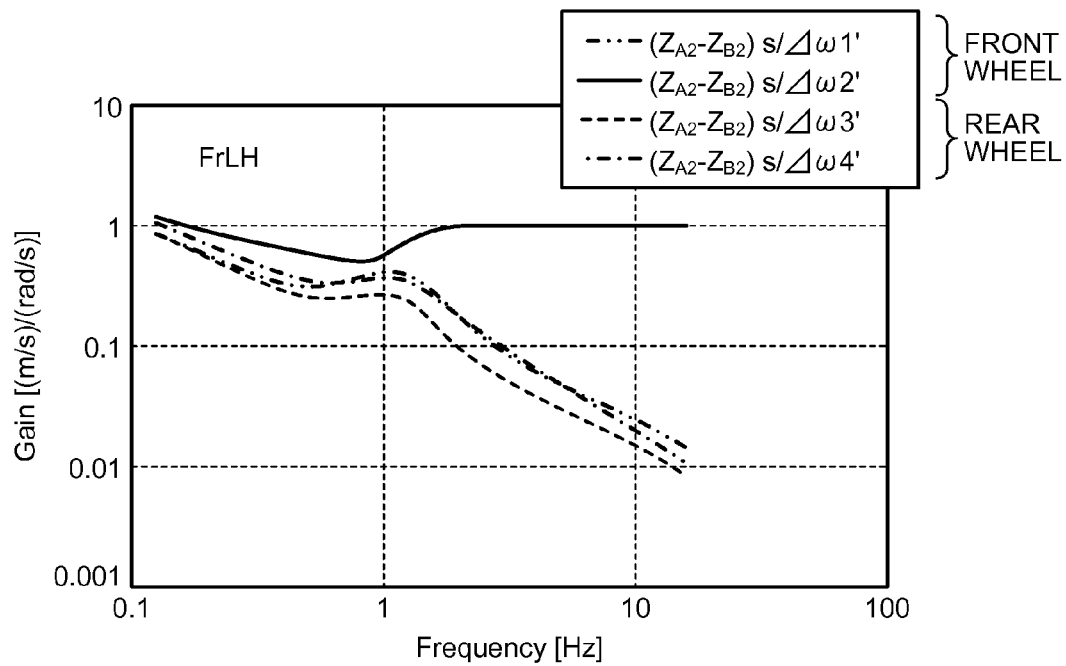
FIG. 19 is a view illustrating frequency characteristics of a gain of a front left relative speed with respect to the wheel speed fluctuation amount.
Figure 20:
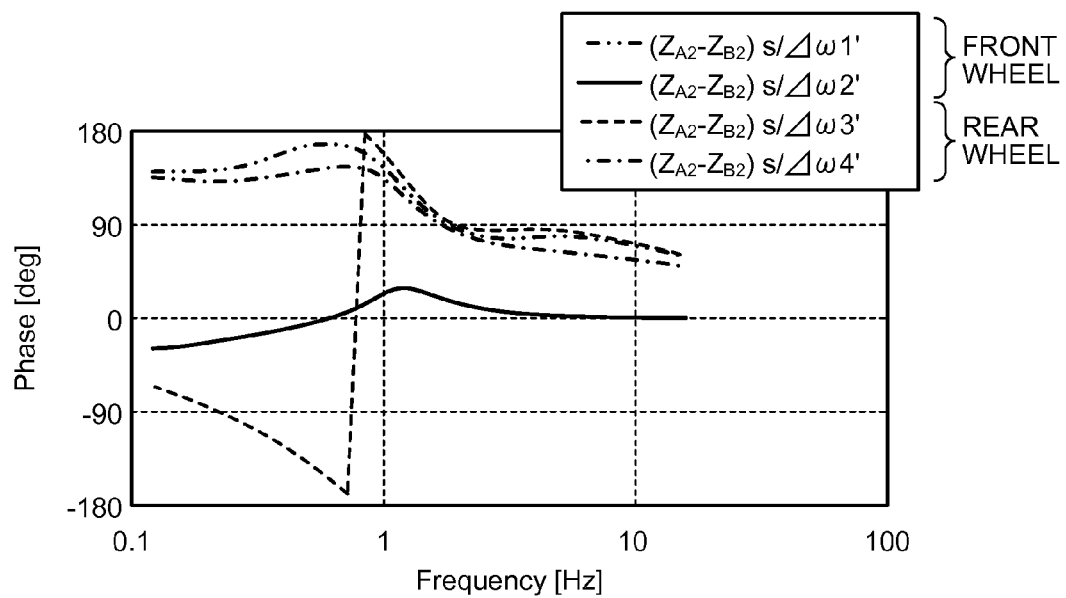
FIG. 20 is a view illustrating frequency characteristics of a phase of the front left relative speed having the phase of the road surface input as a reference.

FIG. 19 and FIG. 20 relate to the relative speed of the sprung portion and the unsprung portion of the front left wheel 2FL (hereinafter simply referred to as "front left relative speed"). FIG. 19 is a view illustrating frequency characteristics of a gain of the front left relative speed with respect to the wheel speed fluctuation amount, and FIG. 20 is a view illustrating frequency characteristics of a phase of the front left relative speed having the phase of the road surface input as a reference. The vertical axis of FIG. 19 indicates a gain of the front left relative speed with respect to the wheel speed fluctuation amount Δω of each wheel 2. The vertical axis of FIG. 20 indicates the phase of the front left relative speed having the phase of the road surface input to each wheel 2 as a reference.

Figure 21:
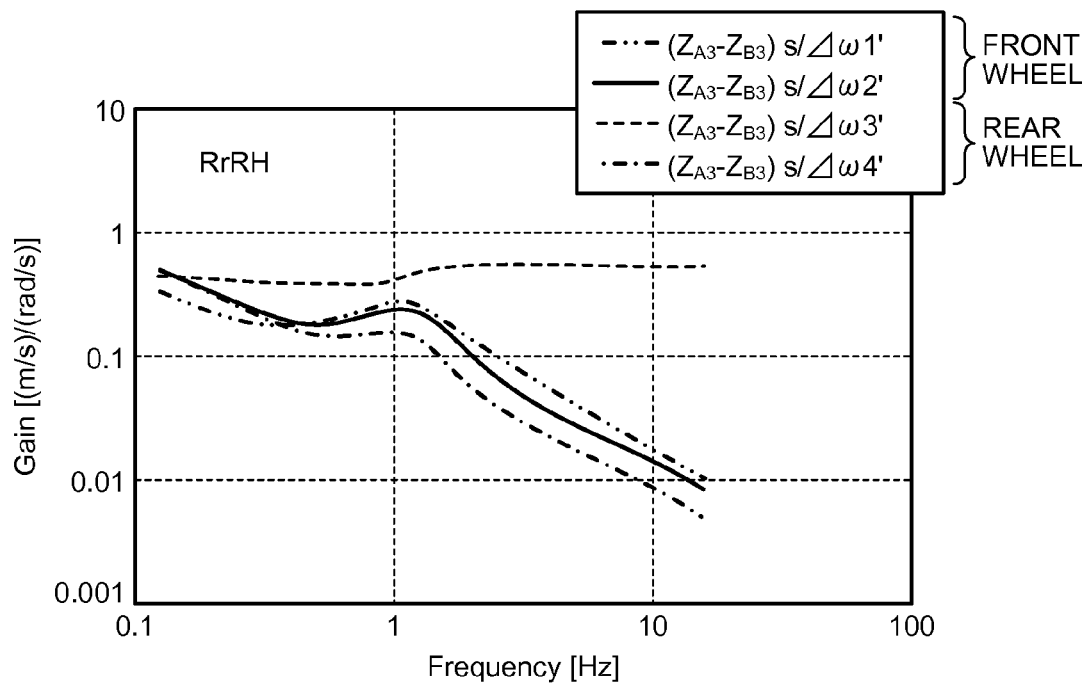
FIG. 21 is a view illustrating frequency characteristics of a gain of a rear right relative speed with respect to the wheel speed fluctuation amount.
Figure 22:
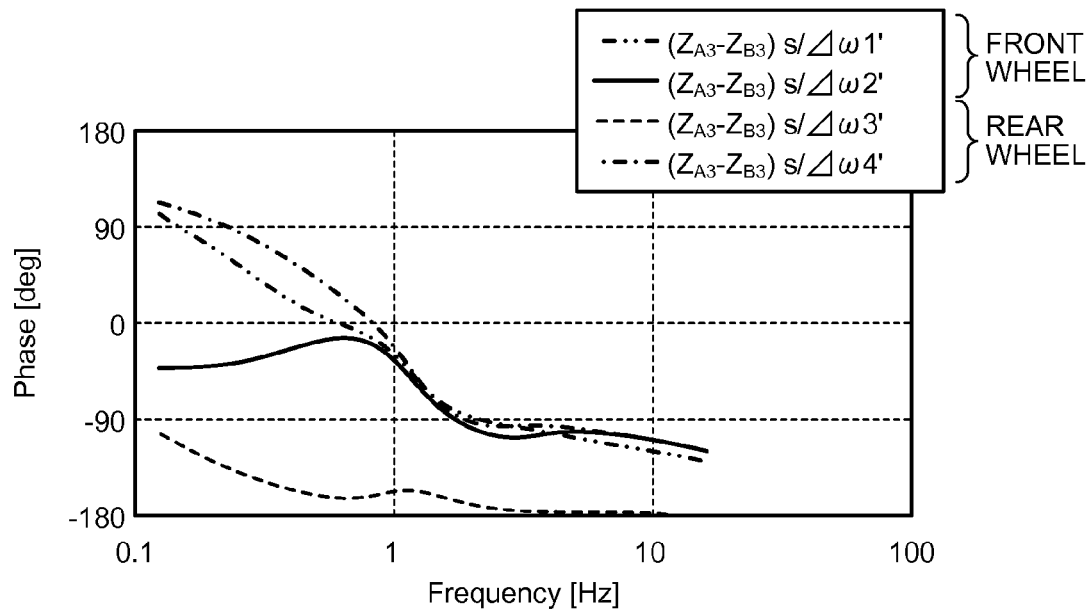
FIG. 22 is a view illustrating frequency characteristics of a phase of the rear right relative speed having the phase of the road surface input as a reference.

FIG. 21 and FIG. 22 relate to the relative speed of the sprung portion and the unsprung portion of the rear right wheel 2RR (hereinafter simply referred to as "rear right relative speed"). FIG. 21 is a view illustrating frequency characteristics of a gain of the rear right relative speed with respect to the wheel speed fluctuation amount, and FIG. 22 is a view illustrating frequency characteristics of a phase of the rear right relative speed having the phase of the road surface input as a reference. The vertical axis of FIG. 21 indicates a gain of the rear right relative speed with respect to the wheel speed fluctuation amount Δω of each wheel 2. The vertical axis of FIG. 22 indicates the phase of the rear right relative speed having the phase of the road surface input to each wheel 2 as a reference.

Figure 23:
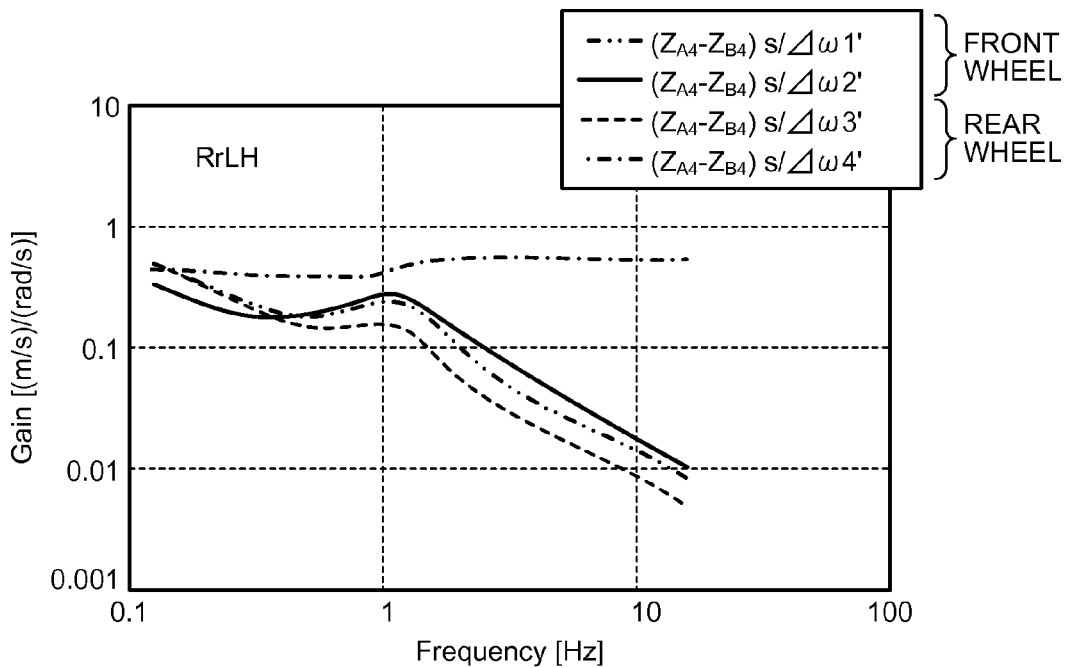
FIG. 23 is a view illustrating frequency characteristics of again of a rear left relative speed with respect to the wheel speed fluctuation amount.
Figure 24:
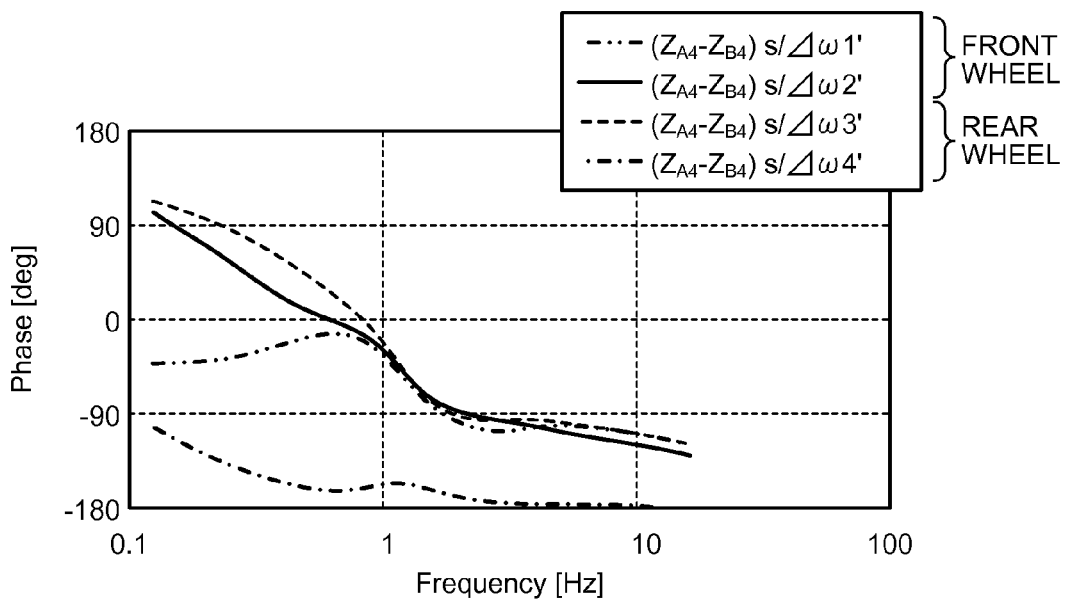
FIG. 24 is a view illustrating frequency characteristics of a phase of the rear left relative speed having the phase of the road surface input as a reference.

FIG. 23 and FIG. 24 relate to the relative speed of the sprung portion and the unsprung portion of the rear left wheel 2RL (hereinafter simply referred to as "rear left relative speed"). FIG. 23 is a view illustrating frequency characteristics of a gain of the rear left relative speed with respect to the wheel speed fluctuation amount, and FIG. 24 is a view illustrating frequency characteristics of a phase of the rear left relative speed having the phase of the road surface input as a reference. The vertical axis of FIG. 23 indicates a gain of the rear left relative speed with respect to the wheel speed fluctuation amount Δω of each wheel 2. The vertical axis of FIG. 24 indicates the phase of the rear left relative speed having the phase of the road surface input to each wheel 2 as a reference.

The front left relative speed, the rear right relative speed, and the rear left relative speed can be calculated, similarly to the front right relative speed. The relative speed estimating unit 25c of the present embodiment estimates the relative speed of the sprung portion and the unsprung portion of each wheel 2 through the method described with reference to FIG. 17 to FIG. 24, for example.

Suspension Control

Figure 25:
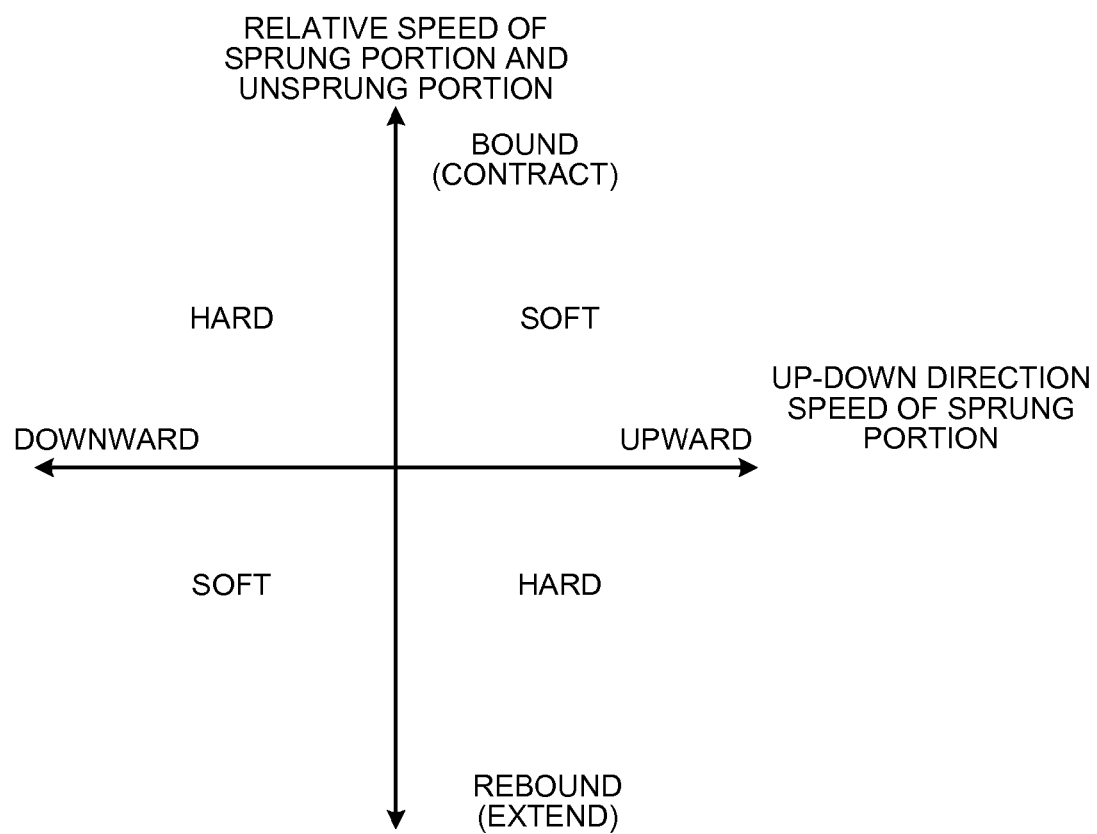
FIG. 25 is an explanatory view of a suspension control of the embodiment.

The vehicle control device 102 according to the present embodiment controls the suspension device 10 of the vehicle 100 based on the estimated value of the sprung state amount and the estimated value of the unsprung state amount caused by the road surface input. Specifically, the ECU 1 serving as the control unit of the present embodiment controls the suspension device 10 based on the total sprung speed calculated from the estimated value of the sprung state amount caused by the road surface input, and the relative speed of the sprung portion and the unsprung portion. The estimated value of the relative speed of the sprung portion and the unsprung portion includes the estimated value of the sprung state amount and the estimated value of the unsprung state amount caused by the road surface input. Therefore, the ECU 1 controls the suspension device 10 based on both the estimated value of the sprung state amount and the estimated value of the unsprung state amount caused by the road surface input. FIG. 25 is an explanatory view of the suspension control of the present embodiment.

In FIG. 25, the horizontal axis indicates the total sprung speed in the up and down direction of the sprung portion, and the vertical axis indicates the relative speed in the up and down direction of the sprung portion and the unsprung portion. In the horizontal axis, the right side of the origin indicates the speed at which the sprung portion moves upward, and the left side of the origin indicates the speed at which the sprung portion moves downward. The absolute value of the total sprung speed becomes larger as being away from the origin. In the vertical axis, the upper side of the origin indicates the relative speed in the direction in which the suspension device 10 contracts, and the lower side of the origin indicates the relative speed in the direction in which the suspension device 10 extends. The absolute value of the relative speed of the sprung portion and the unsprung portion becomes larger as being away from the origin.

The vehicle control device 102 adjusts the attenuating property of the suspension device 10 according to the combination of the total sprung speed and the relative speed of the sprung portion and the unsprung portion. In the present embodiment, when the sprung speed is the upward speed and the relative speed is in the direction in which the suspension device 10 contracts (first quadrant) and when the sprung speed is the downward speed and the relative speed is in the direction in which the suspension device 10 extends (third quadrant), the attenuating properties of the suspension device 10 are relatively soft properties. For example, when the sprung portion is moving upward and the sprung portion and the unsprung portion are relatively moving in the direction in which the front right suspension device 10FR contracts in the front right wheel 2FR, the vehicle control device 102 sets the attenuating properties of the front right suspension device 10FR as the relatively soft properties.

When the sprung speed is the downward speed and the relative speed is in the direction in which the suspension device 10 contracts (second quadrant) and when the sprung speed is the upward speed and the relative speed is in the direction in which the suspension device 10 extends (fourth quadrant), the attenuating properties of the suspension device 10 are set to relatively hard properties.

When the attenuating properties of the suspension device 10 are controlled in such manner, the attenuating properties of the suspension device 10 are switched between the hard properties and the soft properties when the relative speed of the sprung portion and the unsprung portion is switched from the extending direction to the contracting direction or switched from the contracting direction to the extending direction. Furthermore, when the sprung speed is switched from upward to downward or when switched from downward to upward, the attenuating properties of the suspension device 10 are switched.

Therefore, if the estimation accuracy of the relative speed of the sprung portion and the unsprung portion is low, the attenuating properties of the suspension device 10 may be switched although the direction of the relative speed is not switched, or the attenuating properties of the suspension device 10 may not be switched although the direction of the relative speed is switched. Similarly for the sprung speed, if the estimation accuracy of the sprung speed is low, the attenuating properties of the suspension device 10 may be switched although the direction of the sprung speed is not switched, or the attenuating properties of the suspension device 10 may not be switched although the direction of the sprung speed is switched.

On the other hand, the vehicle state estimating device 101 of the present embodiment can accurately estimate the sprung speed and the relative speed of the sprung portion and the unsprung portion. Therefore, according to the vehicle state estimating device 101 and the vehicle control device 102 of the present embodiment, conflict between the actual value of the sprung speed and the relative speed of the sprung portion and the unsprung portion, and the attenuating properties of the suspension device 10 is suppressed.

Vehicle State Estimating Method

As described above, the vehicle state estimating device 101 and the vehicle control device 102 of the present embodiment can execute the vehicle state estimating method illustrated below.

The vehicle state estimating method executed by the vehicle state estimating device 101 and the vehicle control device 102 includes a wheel speed detecting procedure of detecting a wheel speed of each wheel; a brake operation amount detecting procedure of detecting a brake operation amount; a drive operation amount detecting procedure of detecting a drive operation amount; a steering operation amount detecting procedure of detecting a steering operation amount; an operation input caused state amount estimating procedure of estimating a sprung state amount of the vehicle caused by the operation input based on the brake operation amount, the drive operation amount, and the steering operation amount; an operation input caused fluctuation estimating procedure of estimating a wheel speed fluctuation amount caused by the operation input based on the sprung state amount caused by the operation input; an actual fluctuation estimating procedure of estimating the actual wheel speed fluctuation amount from which the wheel speed fluctuation amount by the brake/drive force is excluded based on the wheel speed detected in the wheel speed detecting procedure; a road surface input caused fluctuation estimating procedure of estimating the wheel speed fluctuation amount caused by the road surface input by removing the wheel speed fluctuation amount caused by the operation input from the actual wheel speed fluctuation amount; and a road surface input caused state amount estimating procedure of estimating at least one of the sprung state amount and the unsprung state amount caused by the road surface input based on the wheel speed fluctuation amount caused by the road surface input.

In the present embodiment, the wheel speed detection unit 4 executes the wheel speed detecting procedure. The brake operation amount detection unit 5 executes the brake operation amount detecting procedure. The drive operation amount detection unit 6 executes the drive operation amount detecting procedure. The steering operation amount detection unit 7 executes the steering operation amount detecting procedure.

The first state amount estimating unit 21 executes the operation input caused state amount estimating procedure. The first fluctuation estimating unit 22 executes the operation input caused fluctuation estimating procedure. The second fluctuation estimating unit 23 executes the actual fluctuation estimating procedure. The third fluctuation estimating unit 24 executes the road surface input caused fluctuation estimating procedure. The second state amount estimating unit 25 executes the road surface input caused state amount estimating procedure.

The vehicle state estimating method may further include a total sprung state amount estimating procedure of estimating a total sprung state amount, which is the sprung state amount in which the estimated value of the sprung state amount caused by the operation input and the estimated value of the sprung state amount caused by the road surface input are added. In the present embodiment, the third state amount estimating unit 26 executes the total sprung state amount estimating procedure.

The executing order of each procedure of the vehicle state estimating method of the present embodiment can be appropriately defined, and thus is not limited to the described order.

Variant of Embodiment

A variant of the embodiment described above will now be described. In the embodiment described above, the vehicle state estimating device 101 estimates both the sprung speed and the relative speed of the sprung portion and the unsprung portion based on the wheel speed fluctuation amount $\Delta\omega'$ caused by the road surface input, but is not limited thereto. The vehicle state estimating device 101 may estimate only the sprung speed, estimate only the unsprung speed, or estimate only the relative speed of the sprung portion and the unsprung portion based on the wheel speed fluctuation amount $\Delta\omega'$ caused by the road surface input. In place of the method based on the wheel speed fluctuation amount Δω' caused by the road surface input, the vehicle state estimating device 101 may estimate one of the sprung speed or the relative speed of the sprung portion and the unsprung portion through other methods.

For example, the sprung speed may be estimated from the detection value of an acceleration detection unit that detects the acceleration of the sprung portion. The acceleration detection unit includes, for example, an acceleration sensor that detects the acceleration in the front and back direction, the left and right direction, and the up and down direction of the vehicle, an acceleration sensor that detects the yaw angle, and the like. The relative speed of the sprung portion and the unsprung portion, and the unsprung speed may be estimated from the detection result of a stroke detection unit that detects the stroke of the suspension device 10.

The second state amount estimating unit 25 can directly estimate the sprung speed and the relative speed of the sprung portion and the unsprung portion from the wheel speed fluctuation amount Δω' caused by the road surface input without estimating the road surface input $Z_j$. For example, the second state amount estimating unit 25 can calculate the sprung speed from the wheel speed fluctuation amount Δω' caused by the road surface input based on the [Formula 22]. The second state amount estimating unit 25 can also calculate the relative speed of the sprung portion and the unsprung portion from the wheel speed fluctuation amount Δω' caused by the road surface input based on the [Formula 23].

In the embodiment described above, the approximate expression is sometimes used in the theoretical formula, but a more detailed (high order) expression may be used instead of the approximate expression. For example, the high-order expression that takes into consideration the deformation of the tire of the wheel 2, and the like may be used.

In the embodiment described above, the attenuating properties of the suspension device 10 are switched in two stages, soft and hard, but the control mode of the attenuating properties is not limited thereto. For example, the attenuating properties of the suspension device 10 may be switched to a plurality of hardnesses of three or more stages.

In the embodiment described above, the ECU 1 serving as the control unit controls the suspension device 10 based on the total sprung speed and the relative speed of the sprung portion and the unsprung portion, but the state amount used in the control is not limited thereto. The control unit controls the suspension device 10 based on at least one of the estimated value of the sprung state amount and the estimated value of the unsprung state amount caused by the road surface input.

The target of control based on the sprung speed and the relative speed of the sprung portion and the unsprung portion may be other than the suspension device 10. Other devices controlled based on the behavior of the vehicle 100 such as the acceleration/deceleration device and the steering device may be controlled by the control unit.

The contents disclosed in the embodiments and the variants described above can be appropriately combined and executed.

A vehicle state estimating device according to the present invention includes a wheel speed detection unit configured to detect a wheel speed of each wheel; a brake operation amount detection unit configured to detect a brake operation amount; a drive operation amount detection unit configured to detect a drive operation amount; a steering operation amount detection unit configured to detect a steering operation amount; a first state amount estimating unit configured to estimate a sprung state amount of a vehicle caused by an operation input based on the brake operation amount, the drive operation amount, and the steering operation amount; a first fluctuation estimating unit configured to estimate a wheel speed fluctuation amount caused by an operation input based on the sprung state amount caused by the operation input; a second fluctuation estimating unit configured to estimate an actual wheel speed fluctuation amount from which a wheel speed fluctuation amount by a brake/drive force is excluded based on the wheel speed detected by the wheel speed detection unit; a third fluctuation estimating unit configured to estimate a wheel speed fluctuation amount caused by a road surface input by removing a wheel speed fluctuation amount caused by the operation input from the actual wheel speed fluctuation amount; and a second state amount estimating unit configured to estimate at least one of a sprung state amount and an unsprung state amount caused by a road surface input based on the wheel speed fluctuation amount caused by the road surface input. According to the vehicle state estimating device of the present invention, the estimation accuracy in estimating the state amount of the vehicle from the wheel speed can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle state estimating device comprising:
    a wheel speed detection unit configured to detect a wheel speed of each wheel;
    a brake operation amount detection unit configured to detect a brake operation amount;
    a drive operation amount detection unit configured to detect a drive operation amount;
    a steering operation amount detection unit configured to detect a steering operation amount;
    a first state amount estimating unit configured to estimate a sprung state amount of a vehicle caused by the operation input based on the brake operation amount, the drive operation amount, and the steering operation amount;
    a first fluctuation estimating unit configured to estimate a wheel speed fluctuation amount caused by the sprung state amount resulting from the operation input;
    a second fluctuation estimating unit configured to estimate an actual wheel speed fluctuation amount from which a wheel speed fluctuation amount by a brake/drive force is excluded from the wheel speed fluctuation amount detected by the wheel speed detection unit;
    a third fluctuation estimating unit configured to estimate a wheel speed fluctuation amount caused by a road surface input by removing the wheel speed fluctuation amount caused by the sprung state amount resulting from the operation input from the actual wheel speed fluctuation amount; and
    a second state amount estimating unit configured to estimate at least one of a sprung state amount or an unsprung state amount caused by the road surface input based on the wheel speed fluctuation amount caused by the road surface input.

2. The vehicle state estimating device according to claim 1, wherein
    the wheel speed fluctuation amount caused by the operation input is estimated based on an up-down displacement, a front-back displacement, and a pitch angle of a sprung gravity center estimated based on the brake operation amount and the drive operation amount, and a left-right displacement, a roll angle, and a yaw angle of a sprung gravity center estimated based on the steering operation amount.

3. The vehicle state estimating device according to claim 2, further comprising:
a third state amount estimating unit configured to estimate a total sprung state amount, which is a sprung state amount obtained by adding an estimated value of the sprung state amount caused by the operation input and an estimated value of the sprung state amount caused by the road surface input.

4. The vehicle state estimating device according to claim 1, further comprising a third state amount estimating unit configured to estimate a total sprung state amount, which is a a sprung state amount obtained by adding an estimated value of the sprung state amount caused by the operation input and an estimated value of the sprung state amount caused by the road surface input.

5. A vehicle control device comprising:
a wheel speed detection unit configured to detect a wheel speed of each wheel;
a brake operation amount detection unit configured to detect a brake operation amount;
a drive operation amount detection unit configured to detect a drive operation amount;
a steering operation amount detection unit configured to detect a steering operation amount;
a first state amount estimating unit configured to estimate a sprung state amount of a vehicle caused by an operation input based on the brake operation amount, the drive operation amount, and the steering operation amount;
a first fluctuation estimating unit configured to estimate a wheel speed fluctuation amount caused by the sprung state amount resulting from the operation input;
a second fluctuation estimating unit configured to estimate an actual wheel speed fluctuation amount from which a wheel speed fluctuation amount by a brake/drive force is excluded from the wheel speed fluctuation amount detected by the wheel speed detection unit;
a third fluctuation estimating unit configured to estimate a wheel speed fluctuation amount caused by a road surface input by removing the wheel speed fluctuation amount caused by the sprung state amount resulting from the operation input from the actual wheel speed fluctuation amount;
a second state amount estimating unit configured to estimate at least one of a sprung state amount or an unsprung state amount caused by the road surface input based on the wheel speed fluctuation amount caused by the road surface input; and
a control unit configured to control a suspension device of the vehicle based on at least one of an estimated value of the sprung state amount or an estimated value of the unsprung state amount caused by the road surface input.

6. A vehicle state estimating method comprising the steps of:
detecting a wheel speed of each wheel;
detecting a brake operation amount;
detecting a drive operation amount;
detecting a steering operation amount;
estimating a sprung state amount of a vehicle caused by an operation input based on the brake operation amount, the drive operation amount, and the steering operation amount;
estimating a wheel speed fluctuation amount caused by the sprung state amount resulting from the operation input;
estimating an actual wheel speed fluctuation amount from which a wheel speed fluctuation amount by a brake/drive force is excluded from the wheel speed fluctuation amount detected in the wheel speed detecting step;
estimating a wheel speed fluctuation amount caused by a road surface input by removing the wheel speed fluctuation amount caused by the sprung state amount resulting from the operation input from the actual wheel speed fluctuation amount; and
estimating at least one of a sprung state amount or an unsprung state amount caused by the road surface input based on the wheel speed fluctuation amount caused by the road surface input.

* * * * *